United States Patent [19]
Fujita et al.

[11] Patent Number: 6,007,261
[45] Date of Patent: *Dec. 28, 1999

[54] PRINTING SYSTEM WITH MEANS TO EXTRACT DATA TYPE BEFORE PRINTING ON A RECORDING MEDIUM

[75] Inventors: Takayuki Fujita, Inagi; Tomokazu Mikawa, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/565,309

[22] Filed: Nov. 30, 1995

[30] Foreign Application Priority Data

Dec. 2, 1994 [JP] Japan ................................ 6-299444
Nov. 27, 1995 [JP] Japan ................................ 7-307422

[51] Int. Cl.⁶ ........................................................ B41J 5/30
[52] U.S. Cl. ............................... 400/61; 400/70; 400/76; 400/109; 400/110
[58] Field of Search ..................... 400/61, 76, 109, 400/110, 70, 63; 395/114, 115; 345/418

[56] References Cited

U.S. PATENT DOCUMENTS

| | | | |
|---|---|---|---|
| 4,805,135 | 2/1989 | Ochi et al. ............................ | 395/114 |
| 5,044,790 | 9/1991 | Kawamura ............................ | 400/76 |
| 5,208,676 | 5/1993 | Invi ...................................... | 395/114 |
| 5,483,622 | 1/1996 | Zimmerman et al. ................ | 395/114 |
| 5,495,560 | 2/1996 | Kumada ................................ | 395/114 |
| 5,505,549 | 4/1996 | Ishiguro ................................ | 400/109 |
| 5,506,944 | 4/1996 | Gentile ................................. | 395/114 |
| 5,535,311 | 7/1996 | Zimmerman .......................... | 395/114 |
| 5,539,865 | 7/1996 | Gentile ................................. | 395/115 |
| 5,577,183 | 11/1996 | Weyand ............................... | 395/114 |
| 5,777,617 | 7/1998 | Kishimoto ............................. | 345/418 |

*Primary Examiner*—Edgar Burr
*Assistant Examiner*—Charles H. Nolan, Jr.
*Attorney, Agent, or Firm*—Fitzpatrick, Cella, Harper & Scinto

[57] ABSTRACT

A host computer checks the frequency of type data such as a character code or a graphic pattern in print data. Type data with a high frequency is registered in a registered character management area in correspondence with a data ID and sent to a printer. The printer registers the received ID and data in a print data registration area. Thereafter, the host computer sends print data obtained upon replacement of the type data with the ID to the printer. The printer identifies an ID included in the print data, replaces the ID with the corresponding type data, and outputs the print data. With this processing, data with a high use frequency can be registered in the printer. Therefore, the data transfer amount from the host computer can be decreased, and the printing processing speed is increased. In addition, since the frequency is totalized, the memory in the printer can be effectively used.

38 Claims, 16 Drawing Sheets

FIG. 13A
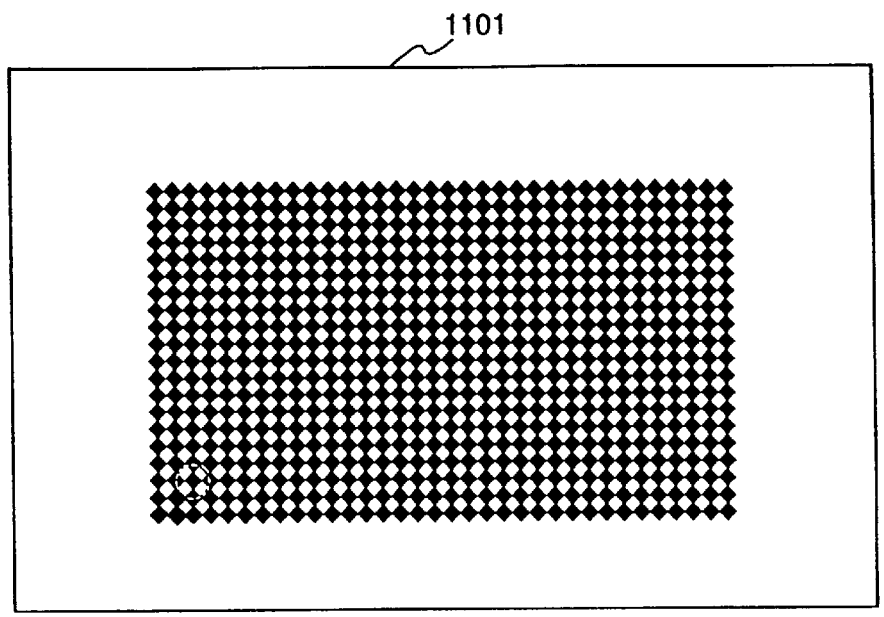
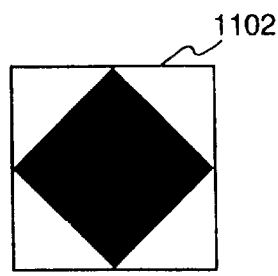
FIG. 13B
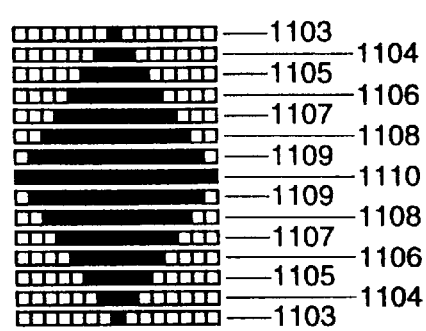
FIG. 13C

PRINTING SYSTEM WITH MEANS TO EXTRACT DATA TYPE BEFORE PRINTING ON A RECORDING MEDIUM

BACKGROUND OF THE INVENTION

1. Field of the Invention

The present invention relates to a printing system for printing data generated by a data source such as a host computer.

2. Related Art

In a conventional printing system, type data such as character data, which appears in a document repeatedly, is registered in a printer by a printer driver in advance, and a printing operation is performed using this data. In such a system, the memory device in the printer has a limitation, so it may be that not all print data or data which needs to be printed can be stored in the printer.

Therefore, data registered in the printer may be data with a low frequency, depending on the print data. In this case, an inherent function of performing high-speed printing processing by registering type data in the printer is not effectively utilized. In addition, the print data transfer amount from the host computer to the printer increases, resulting in an increase in time required for data transfer processing performed by the host computer.

SUMMARY OF THE INVENTION

The present invention has been made in consideration of the above prior art, and has as its object to provide a high-speed printing system which minimizes a load on a host computer.

In order to achieve the above object, according to the present invention, there is provided a print control apparatus for generating print information to be output from a printing apparatus, comprising:

extraction means for extracting type data from print data;

counting means for counting a frequency of the type data extracted by the extraction means; and type data transmission means for causing the type data included in the print information to correspond to an identification code on the basis of the frequency counted by the counting means and transmitting the type data and the corresponding identification code to the printing apparatus.

There is also provided a print control apparatus for causing a printing apparatus to perform a printing operation, comprising:

memory means for storing desired type data and a corresponding identification code;

replacement means for replacing the type data included in print data and stored in the memory means with the identification code; and transmission means for transmitting the resulting print information obtained by the replacement means to the printing apparatus.

According to the present invention, there is provided a printing apparatus for printing and outputting print information from a print control apparatus, comprising:

reception means for receiving type data and a corresponding identification code from the print control apparatus;

memory means for storing the type data received by the reception means in correspondence with the identification code;

second reception means for receiving print data; and output means for replacing the identification code included in the print data with the corresponding type data with reference to the memory means and printing and outputting the resulting print information obtained upon replacement.

According to the present invention, there is provided a printing system having a print control apparatus for generating print information, and a printing apparatus, connected to the print control apparatus, for printing and outputting the print data from the print control apparatus, comprising:

extraction means for extracting type data from the print data;

counting means for counting a frequency of the type data extracted by the extraction means;

memory means for storing the type data in the printing apparatus in correspondence with an identification code in accordance with the frequency counted by the counting means;

second memory means for storing the type data and the corresponding identification code, which are stored in the memory means, in the print control apparatus;

print information transmission means for replacing the type data included in the print data and stored in the second memory means with the corresponding identification code and transmitting the resulting print information obtained upon replacement to the printing apparatus; and output means for receiving the print information, replacing the identification code included in the print data with the corresponding type data, and printing and outputting the print data obtained upon replacement in the printing apparatus.

According to the present invention, there is provided a print control method in a print control apparatus connected to a printing apparatus, comprising:

the extraction step of extracting type data from the print;

the counting step of counting a frequency of the type data extracted in the extraction step;

the type data transmission step of causing the type data included in the print data to correspond to an identification code on the basis of the frequency counted in the counting step and transmitting the type data and the corresponding identification code to the printing apparatus.

There is also provided a print control method of causing a printing apparatus to perform a printing operation, comprising:

the read step of reading print data;

the replacement step of extracting type data which is stored in advance from the print data and replacing the type data with a corresponding identification code; and the transmission step of transmitting the resulting print information obtained in the replacement step to the printing apparatus.

According to the present invention, there is provided a computer readable memory comprising:

an extraction step code for extracting type data from print data;

a counting step code for counting a frequency of the extracted type data; and a transmission step code for causing the type data included in the print data to correspond to an identification code on the basis of the frequency and transmitting the type data and the corresponding identification code to the printing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13, consisting of FIGS. 13A, 13B and 13C, is a view showing a repeat pattern of the fourth embodiment;

DETAILED DESCRIPTION OF THE PREFERRED EMBODIMENTS (First Embodiment)

Figure 1:
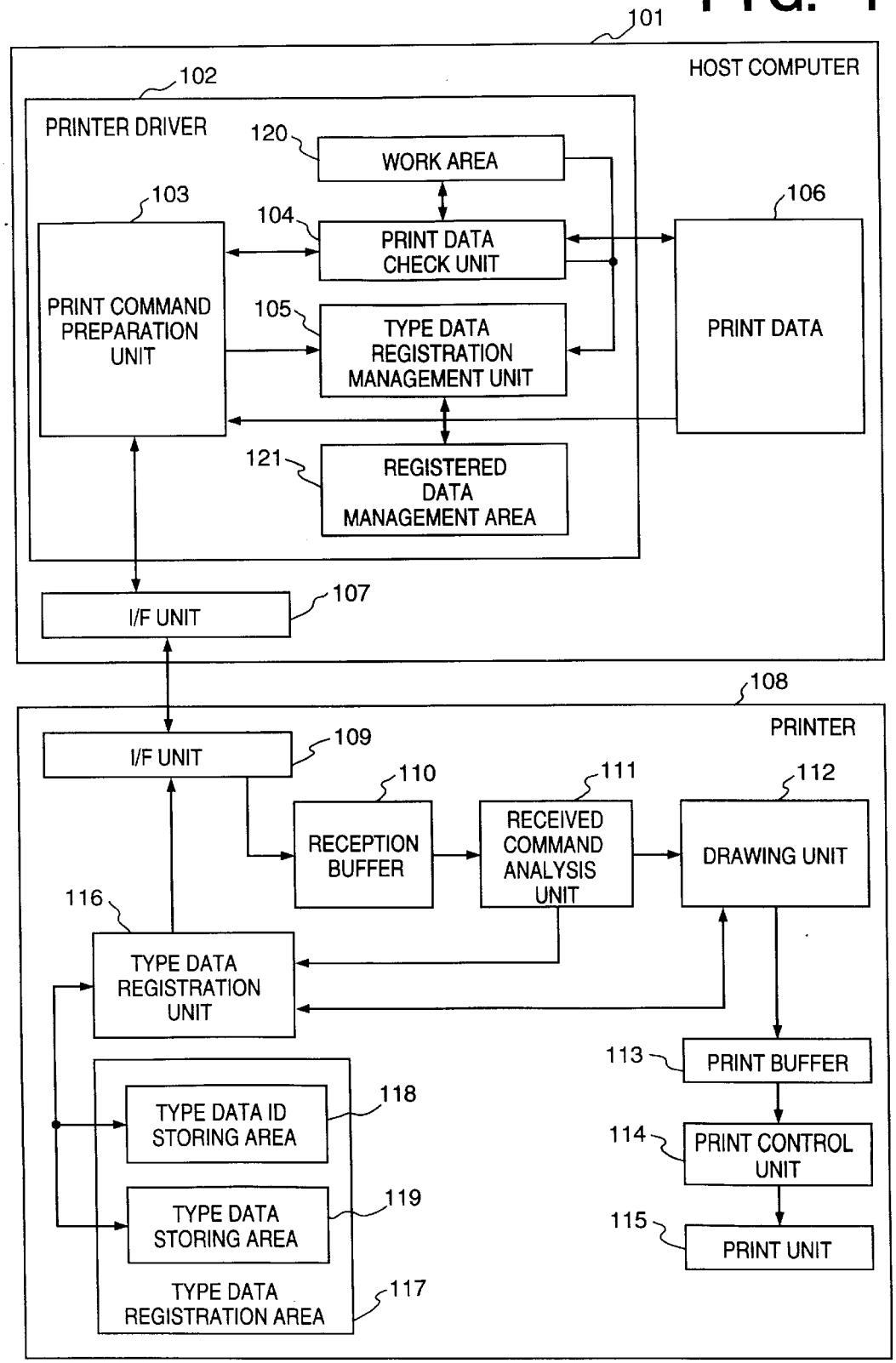
FIG. 1 is a block diagram showing the arrangement of a printing system according to the first embodiment.

FIG. 1 is a block diagram showing the arrangement of a printing system according to the first embodiment. In this embodiment, for descriptive convenience, character string data is used as type data to be registered in a printer. However, this embodiment is not limited to character string data and can also be applied to a repeated pattern which appears in print data. For example, in bit stream data, a pattern appearing in the bit stream data can be used as type data.

Referring to FIG. 1, a host computer 101 has a printer driver 102. When the printer driver 102 receives a print instruction, a print command preparation unit 103 is started. The print command preparation unit 103 requests a print data check unit 104 to check print data 106. The print data 106 is output from an application or the like. The print data check unit 104 checks the print data 106. If registerable character string data is included in the print data 106, the registerable character string data is stored in a work area 120 as type data. If the registerable character string data included in the print data 106 is already present in the work area 120, the generation count of the registerable character string data is incremented by one. Upon completion of check of the print data 106, the print data check unit 104 requests a type data registration management unit 105 to perform type data registration processing. Extraction of a character string can be realized using a known technique for extracting a word or a clause.

The type data registration management unit 105 requests the print command preparation unit 103 to inquire about the space size of a type data storing area 119 in a printer 108. The print command preparation unit 103 prepares an inquiry command for inquiring about the size of unused area of the type data storing area 119 in the printer 108 and requests an I/F unit 107 to transmit the inquiry command to the printer 108. The I/F unit 107 transmits the inquiry command to the printer 108. An I/F unit 109 in the printer 108 stores the inquiry command for inquiring about the size of unused area of the type data storing area 119, which is received from the host computer 101, in a reception buffer 110.

A received command analysis unit 111 extracts the command from the reception buffer 110 and checks the command. Upon recognizing that the command is an inquiry command for inquiring about the space size of the type data storing area 119, the received command analysis unit 111 requests a type data registration processing unit 116 to transmit the space size of the type data storing area 119 to the host computer 101. The type data registration processing unit 116 checks the space size of the type data storing area 119, prepares an answer command for answering the space size of the type data storing area, and requests the I/F unit 109 to transmit the answer command to the host computer 101. Upon reception of the request, the I/F unit 109 in the printer 108 transmits the answer command. The I/F unit 107 in the host computer 101 receives the transmitted answer command.

The I/F unit 107 transfers the received answer command to the print command preparation unit 103. The print command preparation unit 103 acquires the size data of unused area of the type data storing area 119 from the answer command and informs the type data registration management unit 105 of it. The type data registration management unit 105 sets the priority of data in an order from a large generation count of type data stored in the work area 120 in accordance with the informed space size, selects character data with the highest priority, adds a print data ID to the data, and requests the print command preparation unit 103 to register the data in the printer 108.

The print command preparation unit 103 prepares a type data registration command to be sent to the printer 108 and requests the I/F unit 107 to transmit the type data registration command to the printer 108. The I/F unit 107 transmits the type data registration command to the printer 108. The I/F unit 109 in the printer 108 stores the type data registration command received from the host computer 101 in the reception buffer 110. The received command analysis unit 111 extracts the command from the reception buffer 110. Upon recognizing that the command is a type data registration command, the received command analysis unit 111 requests the type data registration processing unit 116 to register the type data ID and character data included in the type data registration command. The type data registration processing unit 116 registers the print data and the corresponding ID in a type data registration area 117 on the basis of the registration request informed by the received command analysis unit 111. Upon completion of registration, a registration end command is prepared, and the I/F unit 109 is requested to transmit the command to the host computer 101. The I/F unit 109 in the printer 108 transmits the registration end command. Upon reception of the registration end command, the I/F unit 107 in the host computer 101 transfers the registration end command to the print command preparation unit 103. When completion of type data registration is informed by the registration end command transferred from the I/F unit 107, the print command preparation unit 103 informs the type data registration management unit 105 of completion of registration. When completion of registration is informed, the type data registration management unit 105 records the registered type data and type data ID registered in a registered character management area 121.

The type data registration processing is repeated during a period while the type data storing area 119 has a space size for allowing registration. Upon completion of type data registration processing, the type data registration management unit 105 informs the print command preparation unit 103 of completion of type data registration processing. Subsequently, the print command preparation unit 103 prepares a print command on the basis of the print data 106. At this time, the print command is prepared while the type data registered in the printer 108 is replaced with the type data registration ID.

When the print command is prepared, the print command preparation unit 103 requests the I/F unit 107 to transmit the print command to the printer 108. Upon reception of the transmission request, the I/F unit 107 transmits the print command to the printer 108. The I/F unit 109 in the printer 108 sequentially stores the received print command in the reception buffer 110. The received command analysis unit 111 extracts the print command from the reception buffer 110, analyzes the command, and transmits the print data included in the print command to a drawing unit 112 to request to draw the data in a print buffer 113.

The drawing unit 112 draws the data in the print buffer 113 on the basis of the print data received from the received command analysis unit 111. Upon finding the type data ID in the print data, the drawing unit 112 transfers the type data ID to the type data registration unit 116 to request corresponding registered print data. The type data registration unit 116 searches the received type data ID from a type data ID storing area 118 and acquires a storing position of print data recorded in correspondence with the type data ID. The type data registration unit 116 acquires print data requested by the drawing unit 112 from a type data storing area 119 on the basis of the acquired print data storing position and transfers the print data to the drawing unit 112.

The drawing unit 112 draws the received print data in the print buffer 113 as a character image. Upon completion of drawing in the print buffer 113, the drawing unit 112 transfers the contents of the print buffer 113 to a print control unit 114, and the data is printed on a recording medium by a print unit 115.

Figure 2:
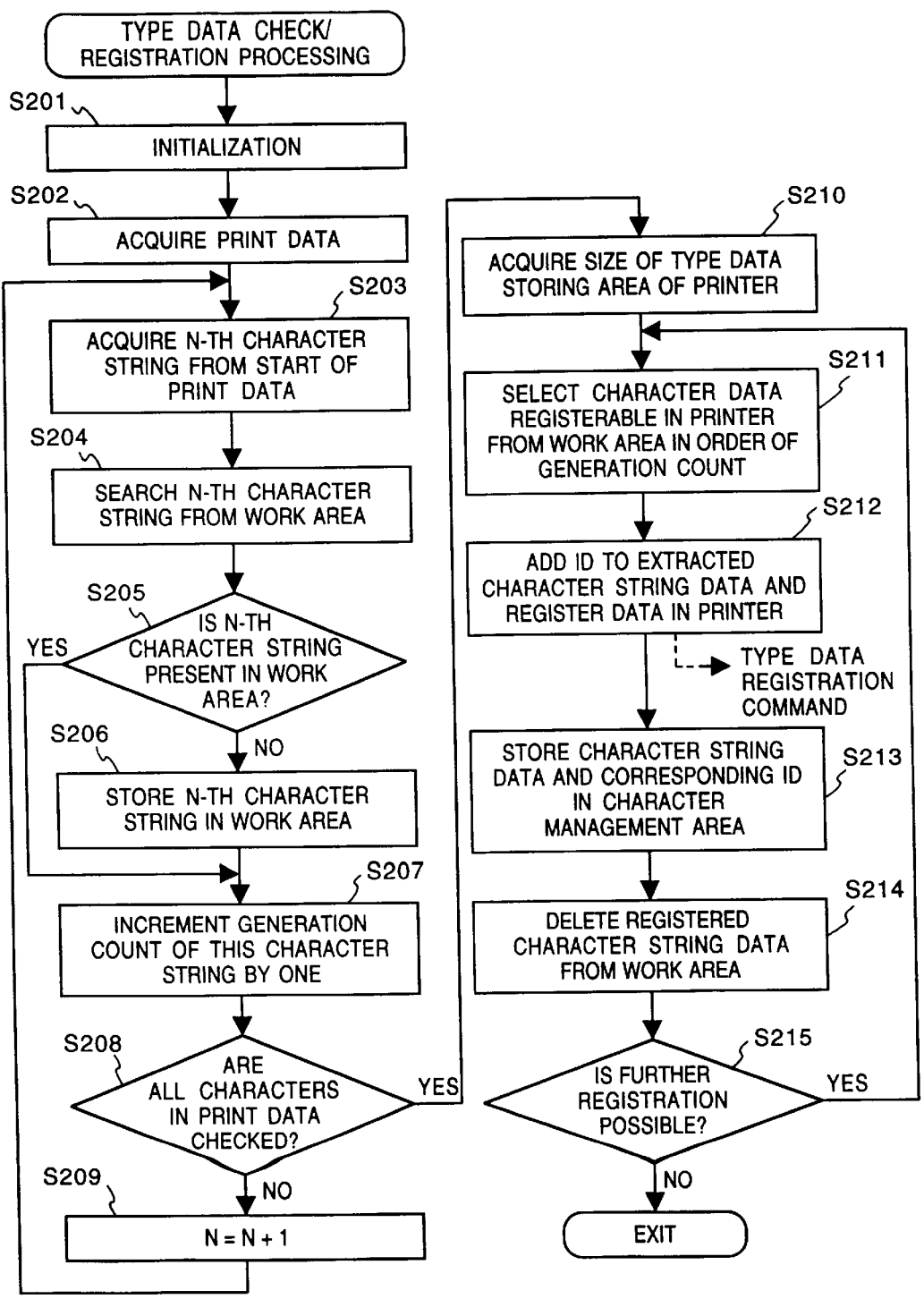
FIG. 2 is a flow chart showing the sequence of print data check processing in the first embodiment.

FIG. 2 is a flow chart showing processing of checking and registration management for print data performed by the host computer 101. This processing is executed by the print data check unit 104 and the type data registration unit 105 shown in FIG. 1.

In step S201, the work area, the generation count, and a character counter N are initialized. In step S202, print data to be printed is acquired. In step S203, the N-th character string included in the print data is extracted. In step S204, the character string data extracted from the work area is searched.

Extraction of a character string can be realized by a known technique for parsing a sentence into the words or extracting a clause or phrase by using a grammar dictionary, as described above. In step S203, the character string is extracted in this manner.

In step S205, the extracted N-th character string is determined. If the character string data is not present in the work area 120, the character string data is stored in the work area 120 in step S206, and the generation count corresponding to this character string data is incremented by one in step S207.

If it is determined in step S205 that the character string data is present in the work area 120, the generation count corresponding to this character string data is incremented by one in step S207. In step S208, it is determined whether all characters in the print data are checked. If NO in step S208, the counter N is incremented by one in step S209. The flow returns to step S203, and processing in steps S203 to S209 is repeated until the check is completed.

If YES in step S208, the size of the print data storing area of the printer is acquired in step S210 to check the amount of registerable character string data in the printer. In step S211, character data with the largest generation count is extracted from the work area. In step S212, a TYPE data ID is added to the character data, and the character data is registered in the printer.

Upon completion of registration, in step S213, the character data and the corresponding TYPE data ID are stored in the registered character management area. In step S214, the character data is deleted from the work area. In step S215, it is determined, on the basis of the size of the print data storing area acquired in step S210, whether registration is still possible. If YES in step S215, the flow returns to step S211, and processing in steps S210 to S215 is repeated until registration is disabled.

If it is determined in step S215 that registration is disabled, the processing is ended.

With the above processing, character strings are registered as type data in the order from data with the highest frequency.

Figure 3:
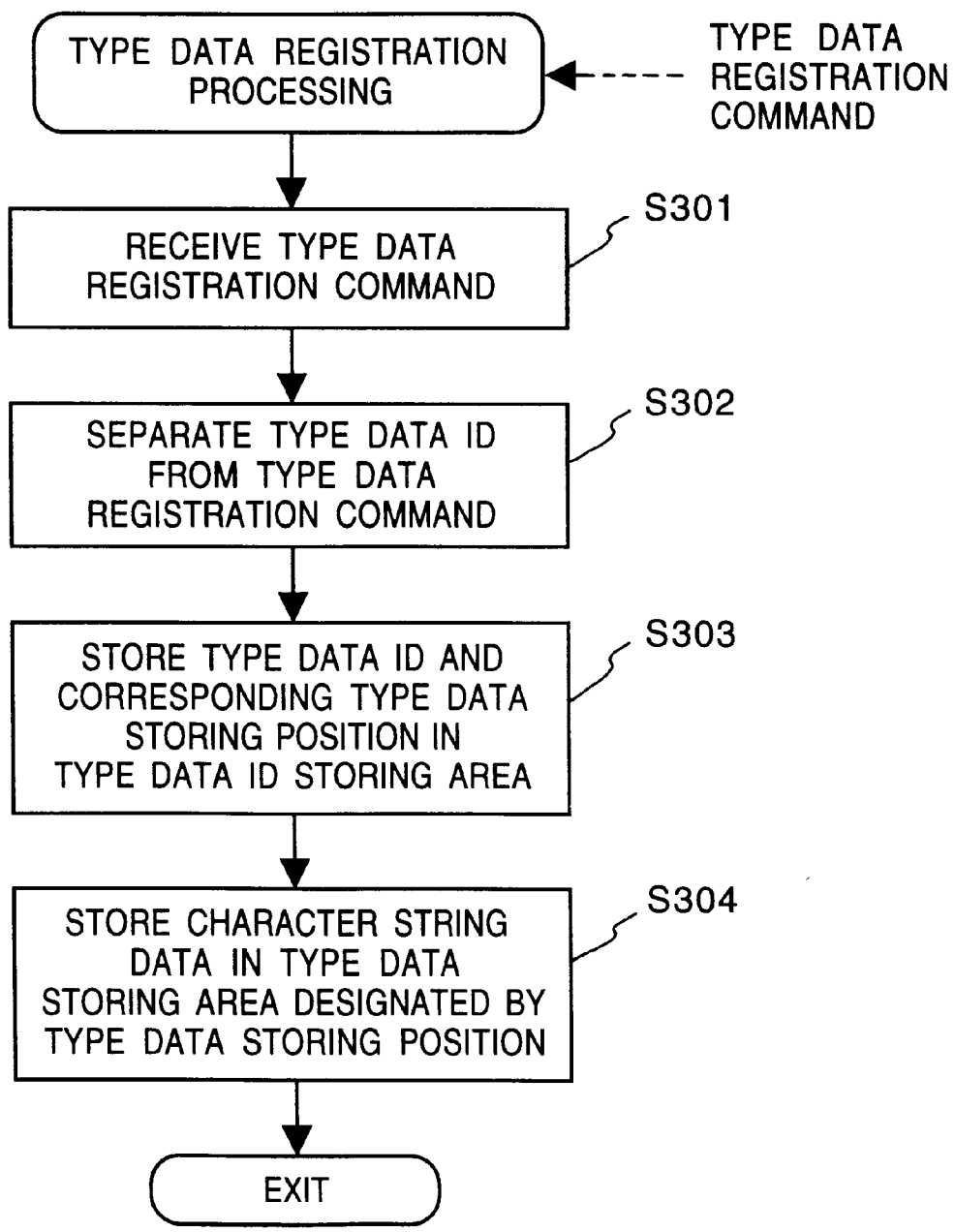
FIG. 3 is a flow chart showing the sequence of print data registration processing in the first embodiment.

FIG. 3 is a flow chart of print data registration processing performed by the printer 108. When the received command analysis unit 111 receives a type data registration command, the type data registration unit 116 is started to execute this processing.

When the received command analysis unit 111 received a type data registration command in step S301, type data and a type data ID are separated in step S302. The type data registration unit 116 stores the type data ID and the corresponding type data in the ID storing area 118 and the type data storing area 119 respectively in steps S303 and S304.

In this manner, character string data is registered in the printer in accordance with the frequency of appearance in a document to be printed. To print the document, the corresponding portion is replaced with the type data ID which is stored in advance, and the data is output from the host computer to the printer. With this processing, the memory of the printer can be efficiently used, and the time required for printing processing can be shortened. In addition, since the data amount sent from the host computer to the printer becomes small, the transfer time is shortened to decrease the load on the host computer, and the time required for printing processing can be shortened.

Figure 10:
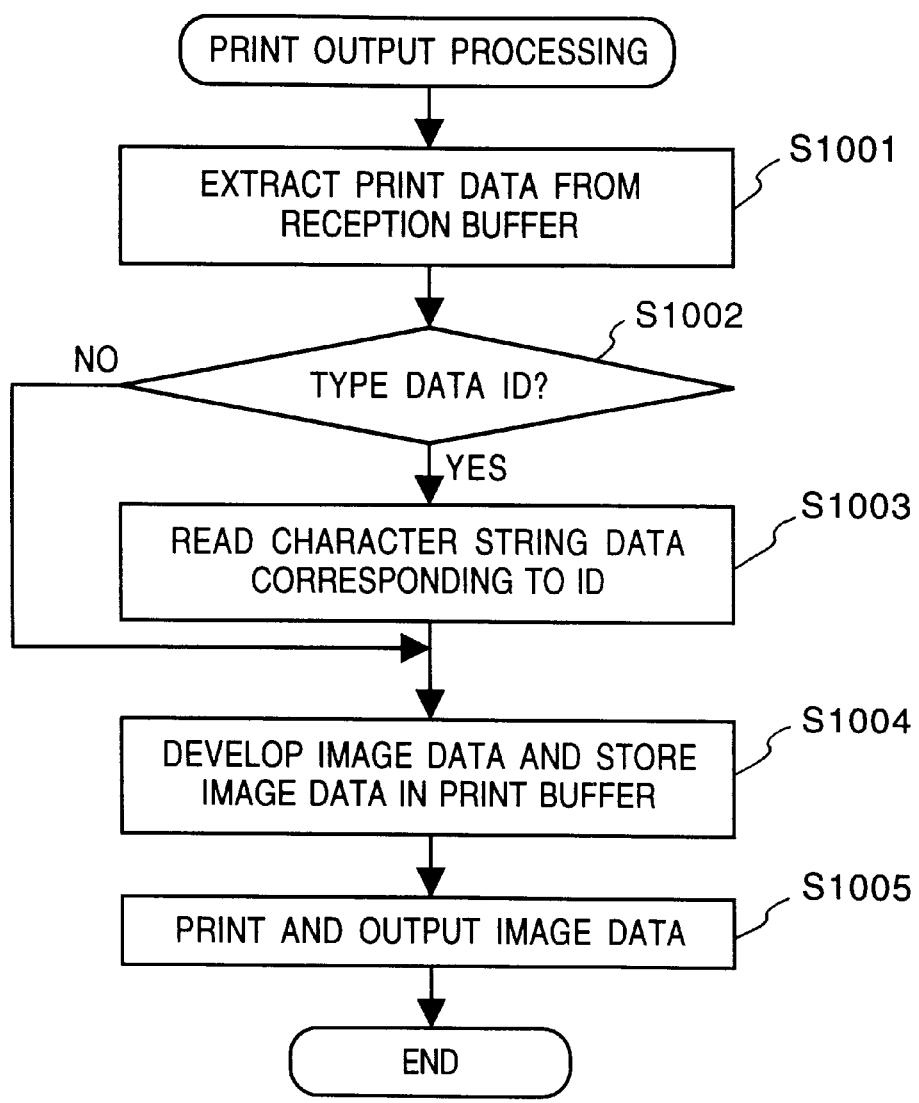
FIG. 10 is a flow chart of output processing by the printer of the embodiment.

FIG. 10 is a flow chart of printing processing of the printer. The above sequence is executed in steps S1001 to S1005.

In step S207 of FIG. 2, the frequency of character string data is counted. However, the data amount which is decreased by registering type data can be calculated at a higher accuracy.

The length of an i-th character string, a word for example, which appears in print data is defined as $L_i$, and the length of a type data ID by which the i-th character string is replaced is defined as $L_\omega$. When the character string is replaced with the type data ID, the data amount decreases by $(L_i-L_\omega)$ per a character string. The data amount of the entire print data is decreased by $(L_i-L_\omega) \times n$ where n is the frequency of the character string.

Therefore, when $(L_i-L_\omega)$ is added instead of incrementing the generation count by one in step S207, a value as an index for a data amount which can be decreased is obtained.

In step S211, on the basis of not the number of character strings but the value counted in step S207, a character string with the largest value is selected and registered as type data.

Figure 11:
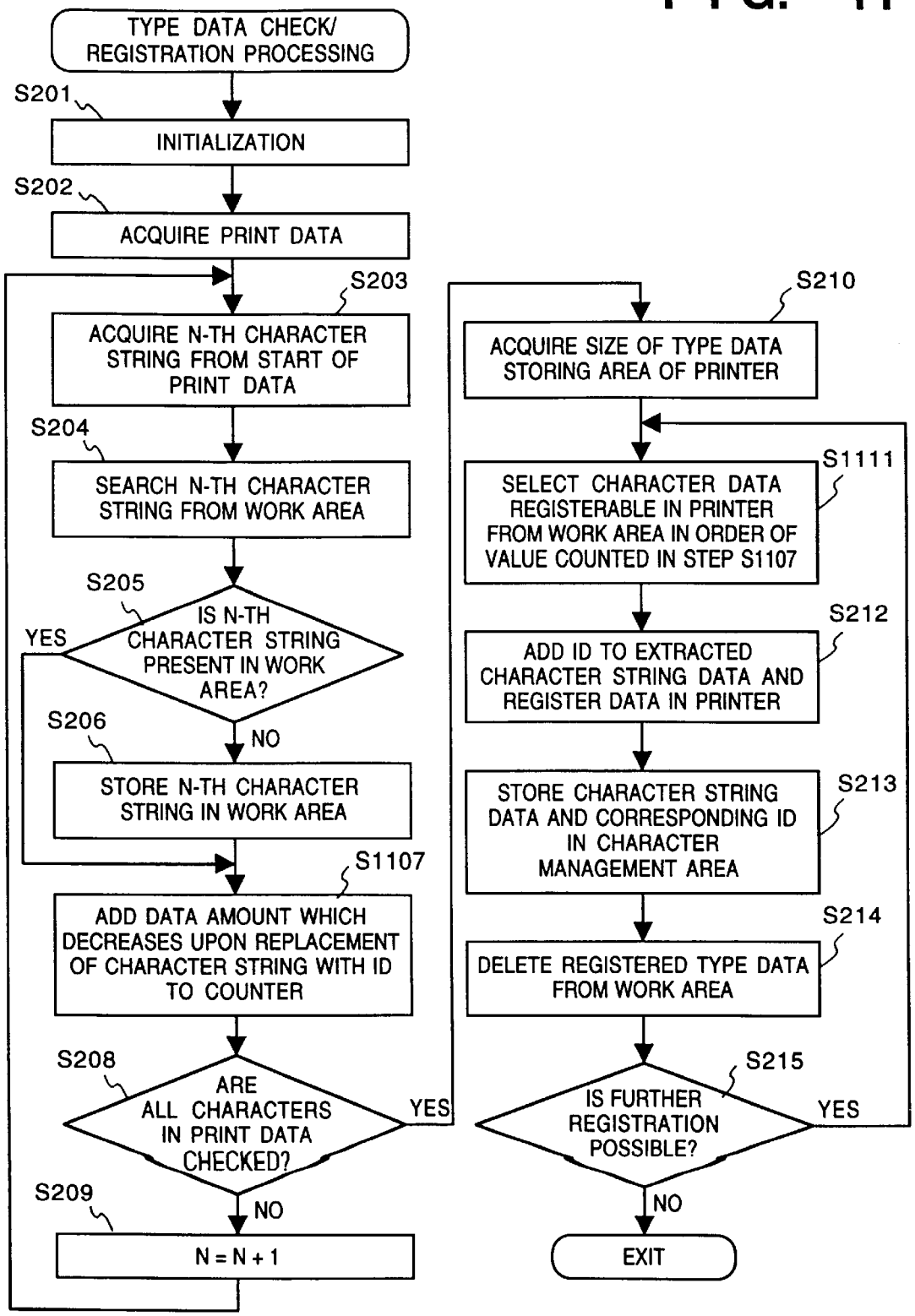
FIG. 11 is a flow chart as a modification of FIG. 2.

FIG. 11 is a flow chart in which steps S207 and S211 are replaced with steps S1107 and S1111 as described above.

This technique for setting a priority can also be applied to the second and third embodiments.

(Second Embodiment)

Figure 4:
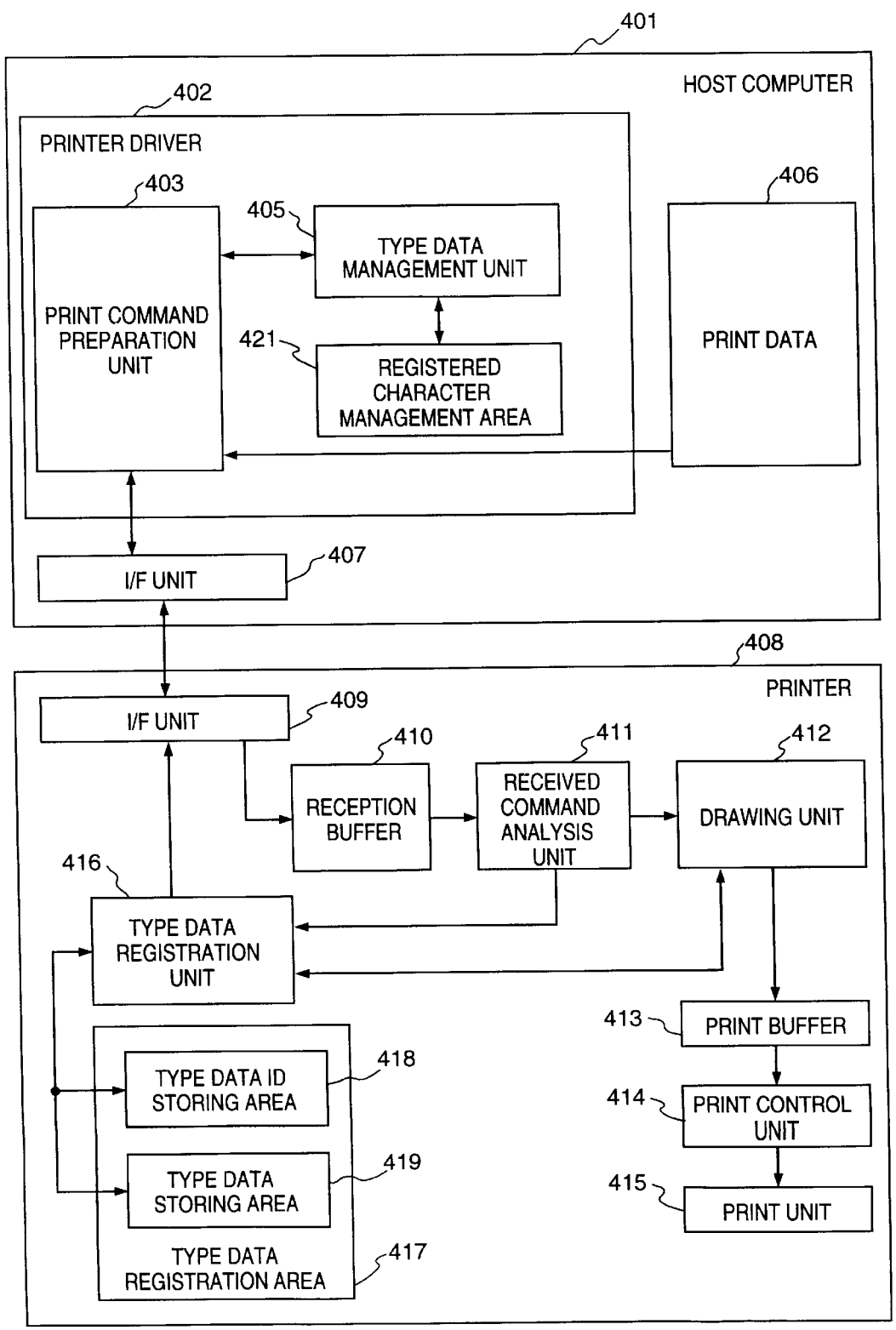
FIG. 4 is a block diagram of a printing system according to the second embodiment.

FIG. 4 is a block diagram showing the arrangement of a printing system according to the second embodiment. In this embodiment, character pattern data is used as type data to be registered.

Referring to FIG. 4, upon reception of a print instruction, a printer driver 402 in a host computer 401 starts a print command preparation unit 403 to prepare a print command on the basis of print data 406. The print data 406 is a character code string output from an application or the like. Upon finding character data registerable in the print data 406, the print command preparation unit 403 requests a type data registration management unit 405 of a type data ID for the character data. The type data registration management unit 405 searches the requested character data from character data registered in a registered character management area 421. If the requested character data is present, the frequency count of this character data is incremented by one, and a type data ID corresponding to the requested data is extracted and transferred to the print command preparation unit 403. However, if the character data is not registered, a type data ID is added to the character pattern data corresponding to the character data, and the print command preparation unit 403 is requested to register the type data ID and the pattern data in a printer 408 as type data. When a size of unused area of a type data storing area 419 of the printer 408 is insufficient for storing the type data, the print command preparation unit 403 is requested to delete type data with the smallest frequency count from the printer 408. Upon completion of deletion, a type data ID is added to the character pattern data to be registered, and the print command preparation unit 403 is requested to register the type data in the printer 408.

The print command preparation unit 403 prepares a type data registration command or a type data deletion command to the printer 408 and requests an I/F unit 407 to transmit the command to the printer 408. The I/F unit 407 transmits the prepared command to the printer 408. An I/F unit 409 in the printer 408 stores the type data registration command received from the host computer 401 in a reception buffer 410. A received command analysis unit 411 extracts a command from the reception buffer 410. If the extracted command is a type data registration command, the received command analysis unit 411 requests a type data registration unit 416 to extract a type data ID and character pattern data from the type data registration command and register the type data ID and the pattern data. If the command is a type data deletion command, the received command analysis unit 411 requests the type data registration unit 416 to extract a type data ID from the type data deletion command and delete the type data ID character pattern data corresponding to the type data ID.

The type data registration processing unit 416 performs registration or deletion processing which is requested by the received command analysis unit 411. Upon completion of processing, the type data registration unit 416 prepares a registration or deletion end command and requests the I/F unit 409 to transmit the command to the host computer 401. The I/F unit 409 in the printer 408 transmits the processing end command. The I/F unit 407 in the host computer 401 receives the processing end command. The I/F unit 407 transfers the received processing end command to the print command preparation unit 403. When completion of type data registration or deletion is informed by the processing end command transferred from the I/F unit 407, the print command preparation unit 403 informs the type data registration management unit 405 of completion of registration or deletion.

When completion of the registration processing is informed, the type data registration management unit 405 records the registered character data and corresponding type data ID in the registered character management area 421. When completion of the deletion processing is informed, the deleted character data and corresponding type data ID are deleted from the registered character management area 421. Upon completion of the processing, the type data registration management unit 405 informs the print command preparation unit 403 of the requested type data ID of the character data. The print command preparation unit 403 replaces the character pattern registered as type data with the type data ID on the basis of the print data 406 and the informed character pattern data ID, develops the remaining character data to character pattern, and prepares a print command. When the print command is prepared, the print command preparation unit 403 requests the I/F unit 407 to transmit the print command to the printer 408. Upon reception of the transmission request, the I/F unit 407 transmits the print command to the printer 408. A code sequence necessary for discriminating between the character type data and the type data ID is prepared in preparation of the print command.

The I/F unit 409 in the printer 408 sequentially stores the received command in the reception buffer 410. The received command analysis unit 411 extracts the print command from the reception buffer 410, analyzes the command, and sends print data included in the print command to a drawing unit 412 to request to draw the data in a print buffer 413. The drawing unit 412 draws the data in the print buffer 413 on the basis of the print data received from the received command analysis unit 411. Upon finding a type data ID in the print data, the drawing unit 412 transfers the type data ID to the type data registration processing unit 416 to request corresponding character type data.

The type data registration processing unit 416 searches the transferred type data ID from a type data ID storing area 418 and acquires a storing position of pattern data corresponding to the type data ID. The type data registration processing unit 416 acquires the character pattern data requested by the drawing unit 412 from the type data storing area 419 on the basis of the acquired storing position of the character pattern data and transfers the character pattern data to the drawing unit 412.

The drawing unit 412 draws the received character pattern in the print buffer 413 in stead of the corresponding type data ID. Upon completion of drawing in the print buffer 413, the drawing unit 412 transfers the print buffer 413 to a print control unit 414, and the data is printed on a recording medium by a print unit 415.

Figure 5:
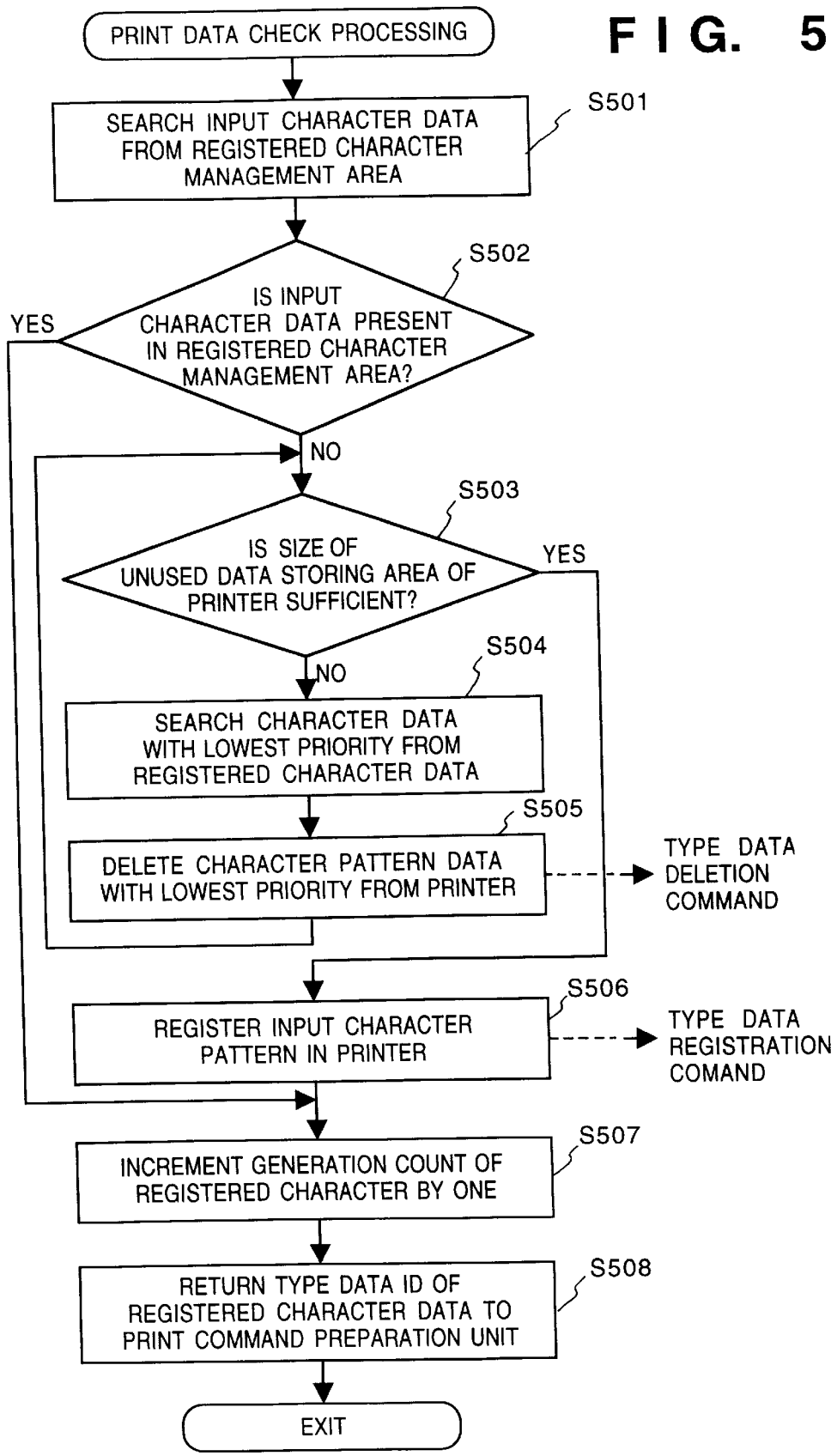
FIG. 5 is a flow chart showing the sequence of print data check processing in the second embodiment.

FIG. 5 is a flow chart of print data check processing executed by the host computer 401. This processing is started when the print command preparation unit 403 finds registerable character data from print data during preparation of a print command.

In step S501, character data transferred from the print command preparation unit 403 is searched from the registered character management area 421. In step S502, it is checked whether the character data is present in the registered character management area 421, i.e., whether the character data is registered as type data. If YES in step S502, the frequency count of this character data is incremented by one in step S507, and the type data ID is informed to the print command preparation unit in step S508, thereby ending the processing.

If NO in step S502, the character pattern data must be registered in the printer. Therefore, it is checked in step S503 whether size of unused area of the type data storing area 419 of the printer has a sufficient space size for registration. This check is realized by inquiring of the printer 408 about the size of unused area, as in the first embodiment. If YES in step S503, type data corresponding to this character is registered in the printer as type data in step S506. In step S507, the frequency count of this character data is incremented by one. In step S508, the print data ID is informed to the print command preparation unit in step S508, thereby ending the processing.

If NO in step S503, character data with the smallest frequency count, i.e., character data with the lowest priority is searched and extracted from the registered character management area 421 in step S504. In step S505, type data corresponding to the character data extracted in step S504 is deleted from the registration area 417 in the printer. Upon completion of deletion, it is checked again in step S503 whether the size of unused area of the type data storing area 419 of the printer is sufficient registering the character pattern data. Processing in steps S503 to S505 is repeated until a sufficient size for registration is obtained.

When the size of unused area of the type data storing area 419 becomes sufficient for registering the character pattern data, the character pattern data is registered in the printer in step S506. In step S507, the frequency count of this character data is incremented by one. In step S508, the type data ID is informed to the print command preparation unit, thereby ending the processing.

Figure 6:
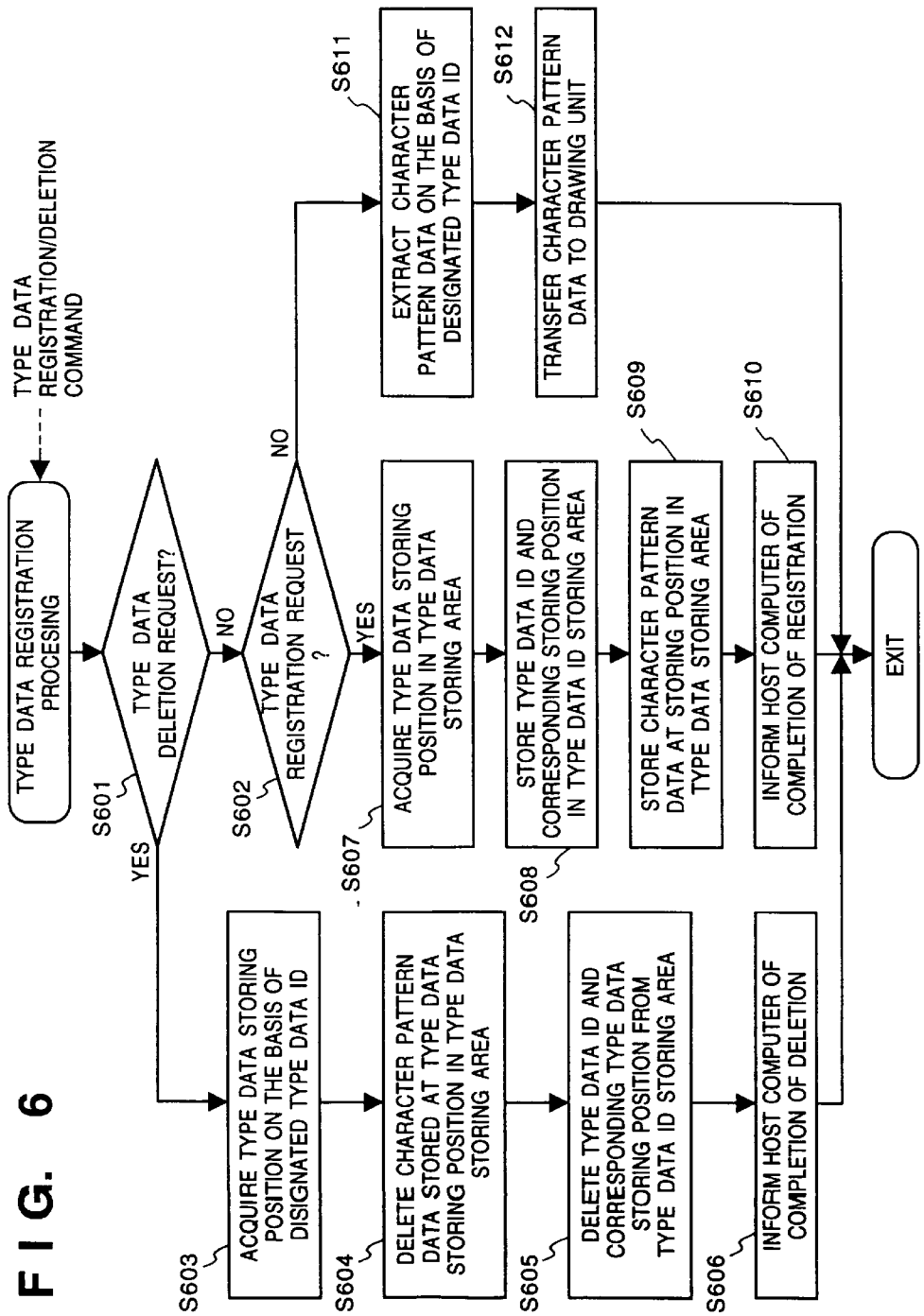
FIG. 6 is a flow chart showing the sequence of print data registration processing in the second embodiment.

FIG. 6 is a flow chart of type data registration processing executed by the printer 408. This processing is started when the received command analysis unit 411 receives a type data registration/deletion command, or when the drawing unit 412 finds a type data ID in a print command.

In step S601, when the received command is a deletion request, a storing position of the character pattern is acquired in step S603 on the basis of the type data ID of character pattern data to be deleted.

In step S604, character pattern data stored at the acquired storing position is deleted from the type data storing area 419. In step S605, the type data ID and the storing position of the character pattern corresponding to the type data ID is deleted from the type data ID storing area 418. In step S606, completion of deletion is informed to the host computer, thereby ending the processing.

If it is determined in the check of step S601 that the command is not a deletion request, it is checked in step S602 whether the request from the source is a registration request. If YES in step S602, a position at which the character pattern data is stored in the type data storing area 419 is obtained in step S607. In step S608, the storing position of the character pattern data and the type data ID are stored in the type data ID storing area 418. In step S609, the character pattern data to be registered is stored at the storing position in the type data storing area 419, which is obtained in step S607. In step S610, completion of registration is informed to the host computer, thereby ending the processing.

If NO in step S602, the received command is a request for character pattern data represented by the type data ID. Therefore, in step S611, character pattern data corresponding to the type data ID is extracted from the type data storing area 419. In step S612, the extracted character pattern data is transferred to the drawing unit 412, thereby ending the processing.

As described above, when the character pattern data is registered in the printer 408 in accordance with the frequency of character data in a document to be printed, the transfer data amount from the host computer to the printer can be decreased to allow high-speed printing processing. In addition, when the type data storing area 719 of the printer 408 has no space, data with the lowest priority is deleted from the registered data, and new data is registered. For this reason, data with a high use frequency can be always stored in the printer, so that printing processing can be performed at a higher speed.

In this embodiment, the frequency of character data in print data is used as an index of priority. However, as in the first embodiment, the reducible data lengths may be accumulated and used as an index. FIG. 11 shows the sequence of printing processing performed by the printer 408.

(Third Embodiment)

Figure 7:
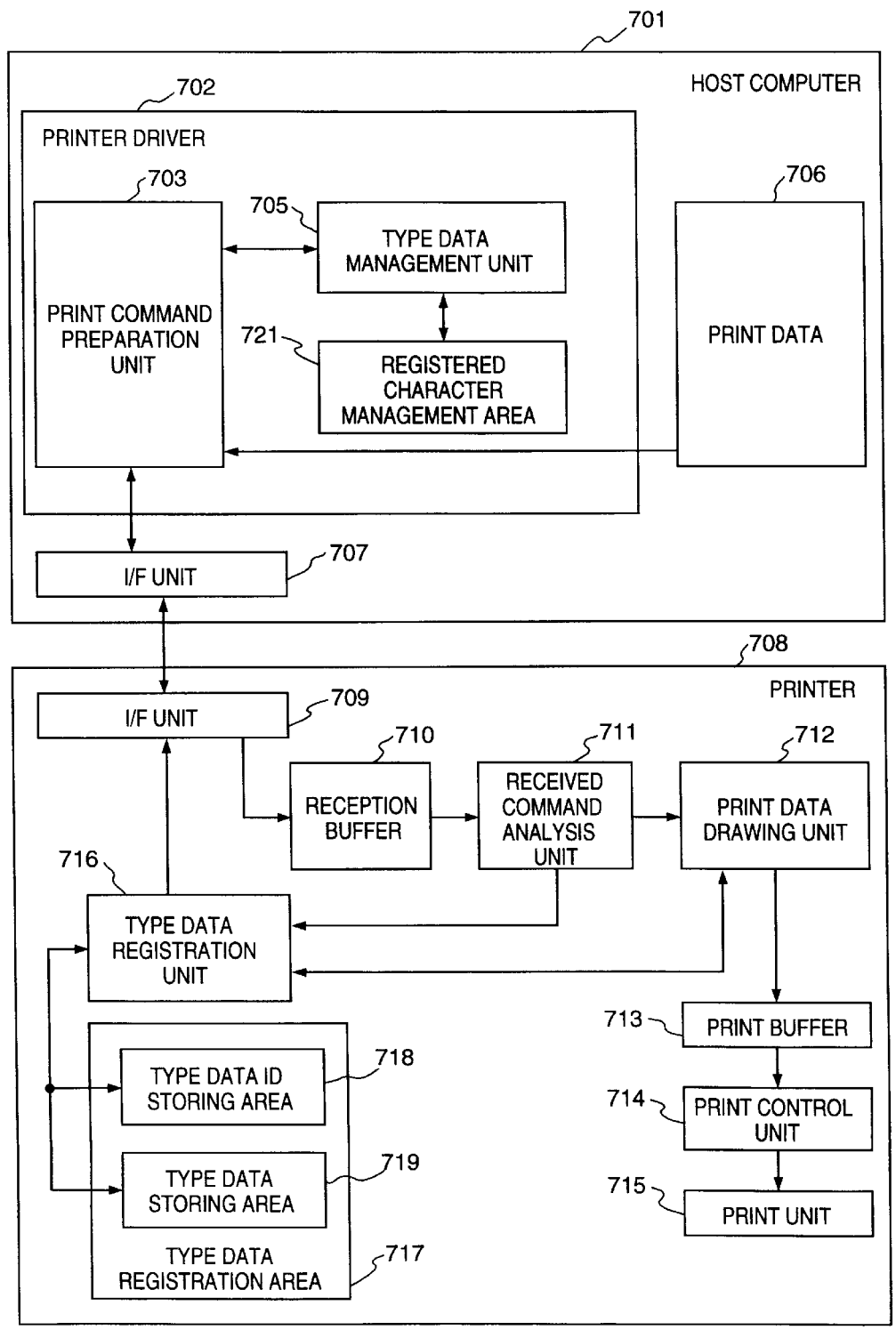
FIG. 7 is a block diagram showing the arrangement of a printing system according to the third embodiment.

FIG. 7 is a block diagram of a printing system according to the third embodiment. In this embodiment, for the descriptive convenience, character string data such as a word is used as type data to be registered.

Referring to FIG. 7, upon reception of a print instruction, a printer driver 702 in a host computer 701 starts a print command preparation unit 703. The print command preparation unit 703 prepares a print command on the basis of print data 706. The print data 706 is output from an application or the like. The print command preparation unit 703 searches registrable character string data in the print data 706 during preparation of the print command. If registrable character string data is present, the print command preparation unit 703 requests a type data ID for registering the character string data as type data. The type data registration management unit 705 searches the character string data from type data registered in a registered character management area 721. If corresponding type data is present, the type data ID of the type data is extracted and transferred to the print command preparation unit 703. However, if the character string data is not registered, a type data ID is added to the data, and the print command preparation unit 703 is requested to register the type data in a printer 708.

The print command preparation unit 703 prepares a type data registration command to the printer 708 and requests an I/F unit 707 to transmit the type data registration command to the printer 708. The I/F unit 707 transmits the type data registration command to the printer 708. An I/F unit 709 in the printer 708 stores the type data registration command received from the host computer 701 in a reception buffer 710. A received command analysis unit 711 extracts the command from the reception buffer 710. If the command is a type data registration command, the received command analysis unit 711 requests a type data registration unit 716 to extract a type data ID and type data from the type data registration command and register the type data ID and the type data. Upon reception of the request from the received command analysis unit 711, the type data registration unit 716 performs registration processing. When a size of unused area of a type data storing area 719 is insufficient for registering the type data, the type data registration unit 716 searches type data with the smallest frequency count and deletes the type data from the type data storing area 719. This deletion processing is repeated until a sufficient size for registration is obtained. When requested registration of the type data is enabled, registration is performed. Upon completion of registration processing, a processing end command is prepared. When registered type data is deleted to register another type data, information representing deletion and the deleted type data ID are added to the processing end command. After the processing end command is prepared, the type data registration unit 716 requests the I/F unit 709 to transmit the processing end command to the host computer 701.

The I/F unit 709 in the printer 708 transmits the processing end and to the host 701. The I/F unit 707 in the host computer 701 receives the processing end command. The I/F unit 707 transfers the received processing end command to the print command preparation unit 703. When the print command preparation unit 703 is informed of completion of type data registration by the processing end command transferred from the I/F unit 707, the print command preparation unit 703 informs the type data registration management unit 705 of completion of registration. If information representing type data deletion is included in the completion command, the deleted type data ID is also informed.

Upon reception of information of completion of processing, the type data registration management unit 705 records the registered type data and type data ID in the registered character management area 721. If information of deletion is included, the deleted type data and type data ID are deleted from the registered character management area 721. Upon completion of processing, the type data registration management unit 705 informs the print command preparation unit 703 of the requested type data ID of the type data. The print command preparation unit 703 prepares a print command on the basis of the print data 706 and the informed type data ID while replacing the type data with the type data ID. When the print command is prepared, the print command preparation unit 703 requests the I/F unit 707 to transmit the print command to the printer 708. Upon reception of the transmission request, the I/F unit 707 transmits the print command to the printer 708. The I/F unit 709 in the printer 708 sequentially stores the received command in the reception buffer 710. The received command analysis unit 711 extracts the print command from the reception buffer 710, analyzes the command, and transfers print data included in the print command to a drawing unit 712 to request to draw the data in a print buffer 713. The drawing unit 712 draws the data in the print buffer 713 on the basis of the print data received from the received command analysis unit 711. Upon finding a type data ID in the print data, the drawing unit 712 transfers the type data ID to the type data registration unit 716 to request corresponding type data.

The type data registration processing unit 716 searches the received type data ID from a type data ID storing area 718 and acquires a storing position of the type data storing position recorded to constitute a pair with the type data ID. The type data registration processing unit 716 acquires type data requested by the drawing unit 712 from the type data storing area 719 on the basis of the acquired storing position of the type data and transfers the type data to the drawing unit 712. The drawing unit 712 draws the received character string data in the print buffer 713 as type data. Upon completion of drawing in the print buffer 713, the drawing unit 712 transfers the contents of the print buffer 713 to a print control unit 714. The data is printed on a recording medium by a print unit 715.

Figure 8:
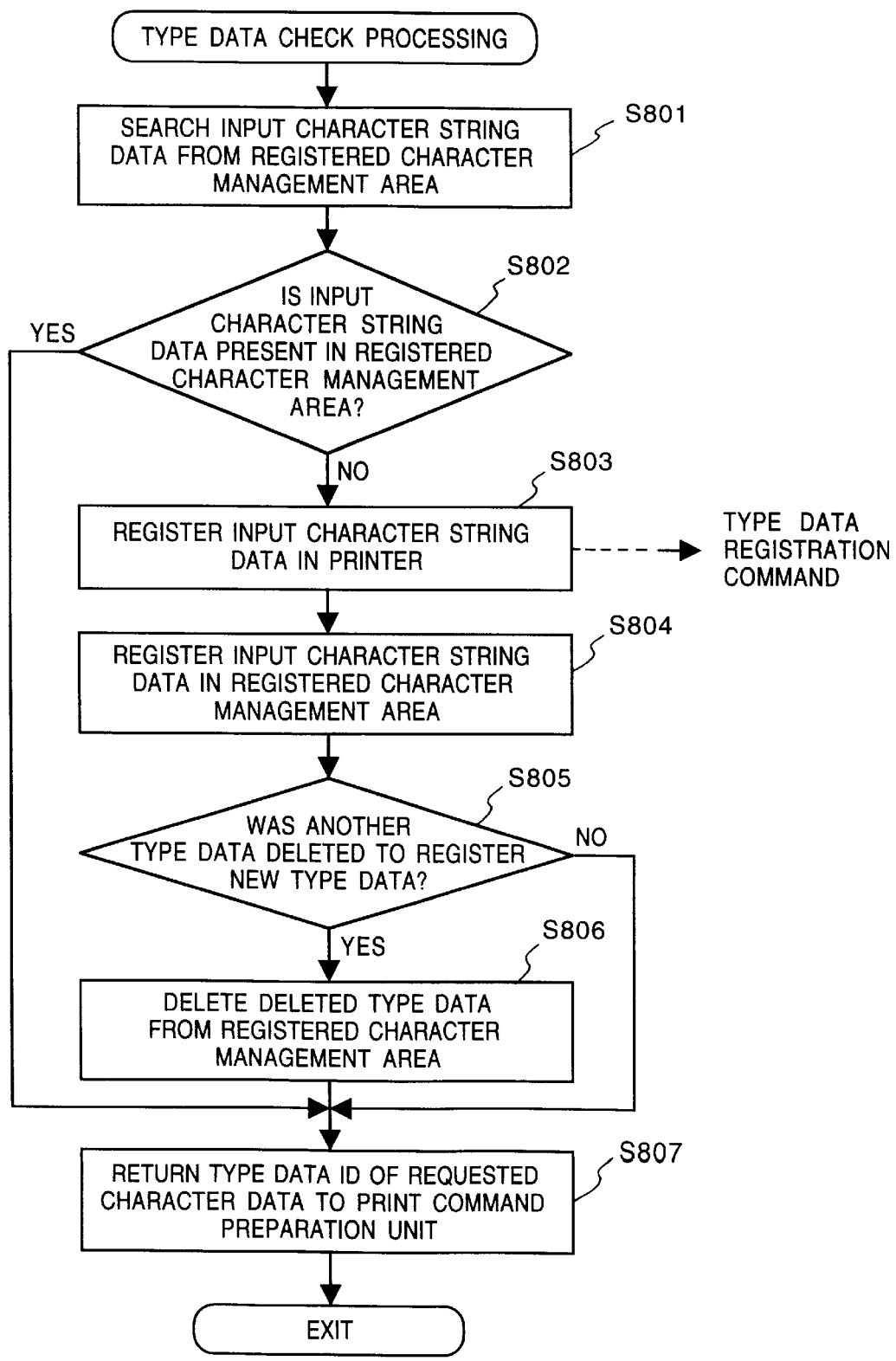
FIG. 8 is a flow chart showing the sequence of print data check processing in the third embodiment.

FIG. 8 is a flow chart of type data check processing performed by the type data registration management unit in the host computer 701. This processing is started when the print command preparation unit 703 finds registrable character string data in print data during preparation of a print command.

In step S801, the type data registration management unit 705 searches the character string data transferred from the print command preparation unit 703 from the character registration management area 721. In step S802, it is checked whether the character data is present in the character registration management area 721. It YES in step S802, the print command preparation unit 703 is informed of the type data ID in step S807, thereby ending the processing. If NO in step S802, the character string data must be registered in the printer. Therefore, in step S803, a type data registration command is issued to the printer 708 to register the type data. On the printer side, when type data registration is completed, the host computer 701 is informed of completion of processing. When this information is received by the host computer, registration is completed.

When registration in the printer is completed, the character string data registered in the printer 708 is registered in the character registration management area 721 in step S804. In some cases, the printer deletes registered type data for type data registration. When deletion has been performed, information representing that deletion has been performed and the deleted type data ID are sent together with information of completion. Therefore, the presence/absence of type data deletion is checked in step S805. If NO in step S805, the print command preparation unit 703 is informed of the type data ID in step S807, thereby ending the processing. If YES in step s805, character string data corresponding to the deleted type data ID which is informed in step S803 is deleted from the registered character management area in step S806. In step s807, the print command preparation unit 703 is informed of the type data ID, thereby ending the processing.

Figure 9:
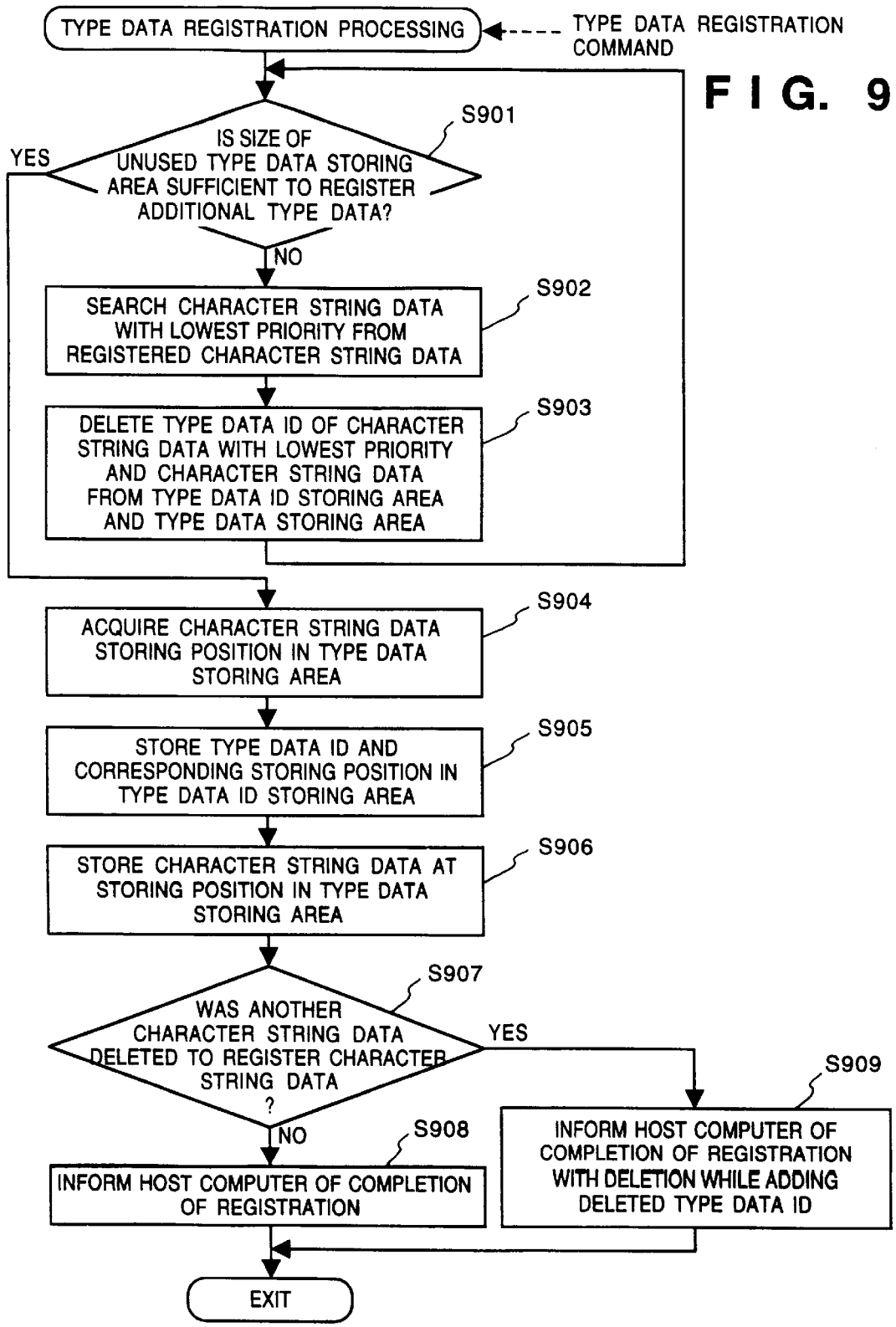
FIG. 9 is a flow chart showing the sequence of print data registration processing in the third embodiment.

FIG. 9 is a flow chart of type data registration processing executed by the printer 708. This processing is started when the received command analysis unit receives a type data registration command.

In step S901, it is checked whether the type data storing area 719 has a sufficient space size for registering type data. If NO in step S901, type data with the smallest frequency count, i.e., type data with the lowest priority is searched from the type data ID storing area 718 in step S902. In step S903, the type data with the low priority and the corresponding type data ID are deleted from the type data ID storing area 718 and the type data storing area 719.

To know the priority on the printer side, the host unit may be inquired about type data with the lowest priority in step S902. In this case, if YES in step S802, the frequency counter of the corresponding type data must be incremented by one on the host side. When type data with the lowest priority is requested by the printer, the host computer returns the ID of type data with the smallest counter value to the printer.

In this manner, type data with the low priority can be found.

Upon completion of deletion, it is checked again in step S901 whether the type data storing area 719 has a sufficient space size for registering the print data. Processing in steps S901 to S903 is repeated until a sufficient space size for registration is obtained. When the type data storing area 719 obtains a sufficient size for registering additional type data, a position in the type data storing area 719 where the type data is stored is obtained in step S904. In step S905, this storing position and the type data ID are stored in the type data ID storing area 718. In step S906, type data to be registered is registered at the storing position obtained in step S905. In step S907, it is checked whether the type data has been deleted in steps S901 to S903.

If NO in step S907, information of completion of registration of registered type data is transmitted to the host computer in step S908, thereby ending the processing. If YES in step S907, information of completion is transmitted to the host computer together with the type data ID of the deleted type data in step S909, thereby ending the processing.

With the above procedures, even when the memory in the printer has a small capacity, character string data which appears in the print data with a high frequency can be stored as type data, and the efficiency of printing processing can be increased. In addition, processing for determining the memory space in the printer, and adding new data after deletion as needed is performed as processing of the printer itself. Therefore, the load on the host computer is decreased.

The present invention can also be applied to an idiom or sentence consisting of a plurality of characters as registrable type data as far as it has a predetermined pattern. In addition to character data, graphic data can also be processed as type data.

(Fourth Embodiment)

Figure 12:
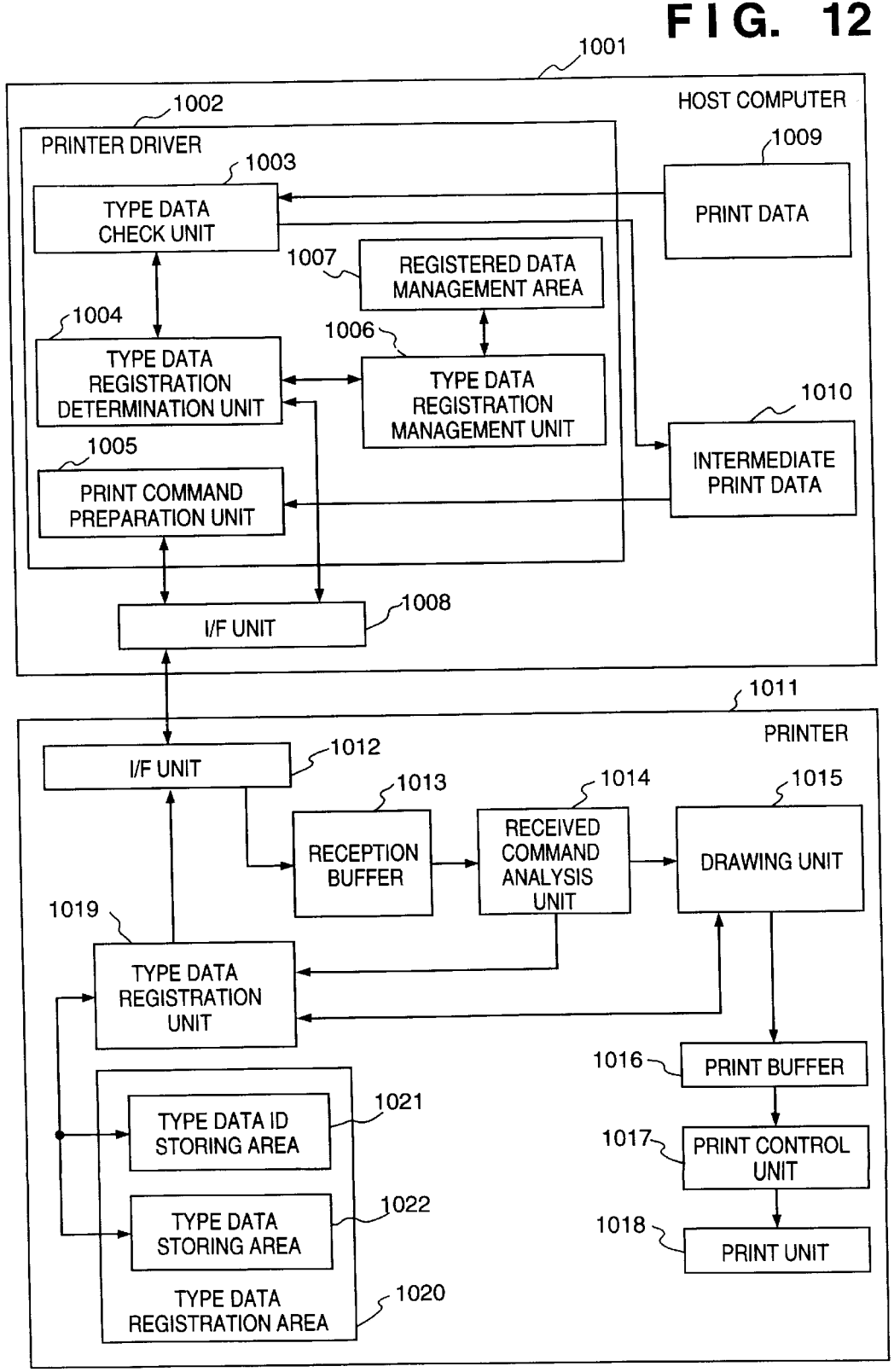
FIG. 12 is a block diagram showing the arrangement of a printing system according to the fourth embodiment.
Figure 15:
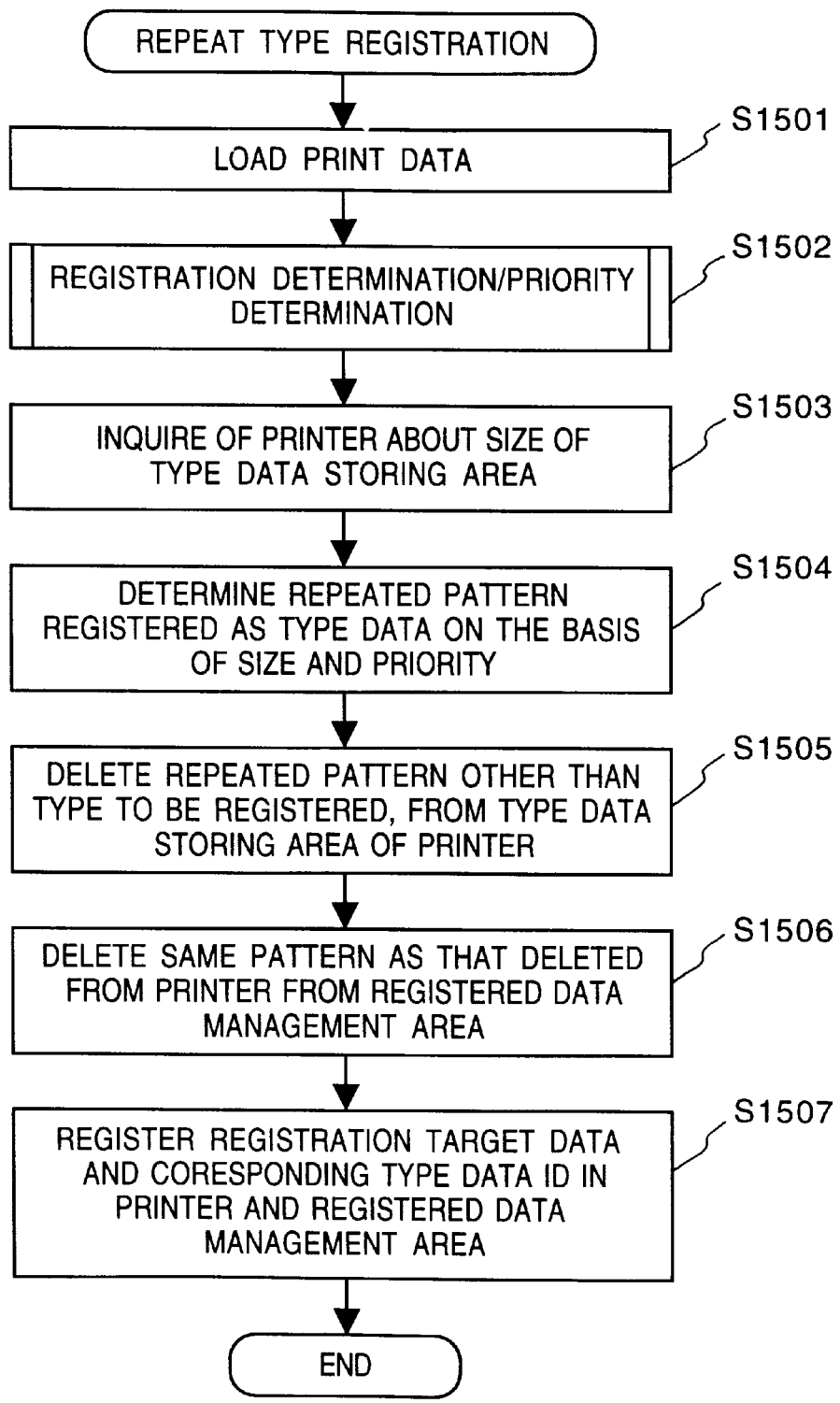
FIG. 15 is a flow chart for registering the repeat pattern in the fourth embodiment.

FIG. 12 is a block diagram showing the arrangement of a printing system according to the fourth embodiment. FIG. 13 shows print data to be processed in this embodiment. Processing on the host computer will be described with reference to the flow chart of FIG. 15.

Referring to FIG. 12, reference numeral 1001 denotes a host computer. Reference numeral 1002 in the host computer 1001 denotes a printer driver. When the printer driver 1002 receives a print instruction, a type data check unit 1003 is activated. The unit 1003 read print data 1009 (step S1501) and check the presence/absence of a repeat pattern which appears in the print data 1009 repeatedly, such as patterns 1103 to 1110.

Upon completion of check of the repeat pattern, the type data check unit 1003 informs a type data registration determination unit 1004 of the found repeat pattern and the corresponding frequency in the print data 1009. The type data registration determination unit 1004 calculates total sizes X and Y, for each registration decision data candidate which is the informed repeat pattern. The total size X is a size of a print command prepared by replacing the repeat patterns with corresponding ID codes having predetermined length. The total size Y is a size of a print command prepared on the basis of the print data 1009 without replacement. The unit 1004 determines the priority such that the repeat patterns are registered in an order of the difference (Y−X) (step S1502).

When the priority is determined, the type data registration determination unit 1004 inquires of a printer 1011 about the size of a type data storing area 1022 (step S1503). Upon reception of the size of the type data storing area 1022 from the printer 1011, registration target data to be registered in the printer is determined on the basis of this size in an order of the priority, i.e., in an order of the difference (X−Y) (step S1504).

The type data registration determination unit 1004 inquires of a type data registration management unit 1006 whether already registered data is present in the determined registration target data.

The type data registration management unit 1006 searches these registration target data from data registered in a registered data management area 1007. If corresponding data is present, a type data ID stored together with the registered data is extracted and transferred to the type data registration unit determination 1004. In addition, the unit 1004 requests the type data registration management unit 1006 of registered data whose IDs are not received, i.e., type data IDs of data other than the registration target data. Upon reception of the type data IDs of data other than the registration target data, the type data registration determination unit 1004 requests the printer 1011 to delete type data having the type data IDs (step S1505). When deletion is completed, the type data registration management unit 1006 is requested to delete the type data deleted from the printer 1011 (step S1506).

Upon completion of deletion, the type data registration determination unit 1004 acquires a type data ID for the registration target data which is not registered yet from the type data registration management unit 1006, adds the type data ID to the registration target data, and requests to register the data in the printer 1011 (step S1507). When the type data registration in the printer 1011 is completed, the type data ID is added to the registration target data, and the type data registration management unit 1006 is requested to register the data (step S1507). The type data determination registration unit 1004 informs the type data check unit 1003 of the registered type data and the corresponding type data ID.

The type data check unit 1003 replaces the registered type data with the type data ID on the basis of the print data 1009 to prepare intermediate print data 1010.

A print command preparation unit 1005 is started to prepare a print data command to be transmitted to the printer 1011 on the basis of the intermediate print data 1010.

The sequence of type data registration/deletion processing performed by the printer 1011 will be described below. This sequence is the same as that shown in FIG. 6.

The type data registration determination unit 1004 prepares a type data registration command or a type data deletion command to be transmitted to the printer 1011 and requests an I/F unit 1008 to transmit the type data registration command to the printer 1011. The I/F unit 1008 transmits the type data registration command to the printer 1011. An I/F unit 1012 in the printer 1011 stores the type data registration command received from the host computer 1001 in a reception buffer 1013. A received command analysis unit 1014 extracts the command from the reception buffer 1013. If this command is a type data registration command, the received command analysis unit 1014 requests a type data registration unit 1019 to extract a type data registration ID and type data from the type data registration command and register the ID and data. If the command is a type data deletion command, the received command analysis unit 1014 requests the type data registration unit 1019 to extract a pattern registration ID from the data deletion command and delete corresponding type data. The type data registration unit 1019 performs registration or deletion processing which is informed by the received command analysis unit 1014. Upon completion of processing, the type data registration unit 1019 prepares a registration or deletion processing end command and requests the I/F unit 1012 to transmit the command to the host computer 1001. The I/F unit 1012 in the printer 1011 transmits the processing end command. The I/F unit 1008 in the host computer 1001 receives the processing end command. The I/F unit 1008 transfers the received processing end command to the type data registration determination unit 1004.

The printing sequence of the printer 1011 will be described below.

The print command preparation unit 1005 prepares a print command on the basis of the intermediate print data 1010. When the print command is prepared, the print command preparation unit 1005 requests the I/F unit 1008 to transmit the print command to the printer 1011. Upon reception of the request, the I/F unit 1008 transmits the print command to the printer 1011.

The I/F unit 1012 in the printer 1011 sequentially stores the received command in the reception buffer 1013. The received command analysis unit 1014 extracts the print command from the reception buffer 1013, analyzes the command, and requests a drawing unit 1015 to draw the data in a print buffer 1016 together with print data included in the print command. The drawing unit 1015 draws the data in the print buffer 1016 on the basis of the type data received from the received command analysis unit 1014. Upon finding a type data ID in the print data, the drawing unit 1015 transfers the type data ID to the type data registration unit 1019 to request corresponding type data. The type data registration unit 1019 searches the received type data ID from a type data ID storing area 1021 to acquires a type data storing position recorded in correspondence with the type data ID. The type data registration unit 1019 acquires the type data requested by the drawing unit 1015 from a type data storing area 1022 on the basis of the acquired type data storing position and transfers the type data to the drawing unit 1015. The drawing unit 1015 draws the received type data in the print buffer 1016. Upon completion of drawing in the print buffer 1016, the drawing unit 1015 transfers the print buffer 1016 to a print control unit 1017. The data is printed on a recording medium by a print unit 1018. The above sequence is shown in FIG. 10.

FIG. 13 is a view showing an example of dividing print data into repeat patterns. The repeat pattern often appears in a painted pattern output from an application or the like. Print data 1101 has rhombuses arranged in a rectangle at the center. A rhombus 1102 is one of these rhombuses. When the rhombus 1102 is divided into 15×15 cells, the rhombus 1102 can be formed of cell data 1103 to 1110 each consisting of 15×1 cells. Therefore, the effective range of the print data 1101 is constituted by repeating the cell data 1103 to 1110 each having 15×1 cells.

Figure 14:
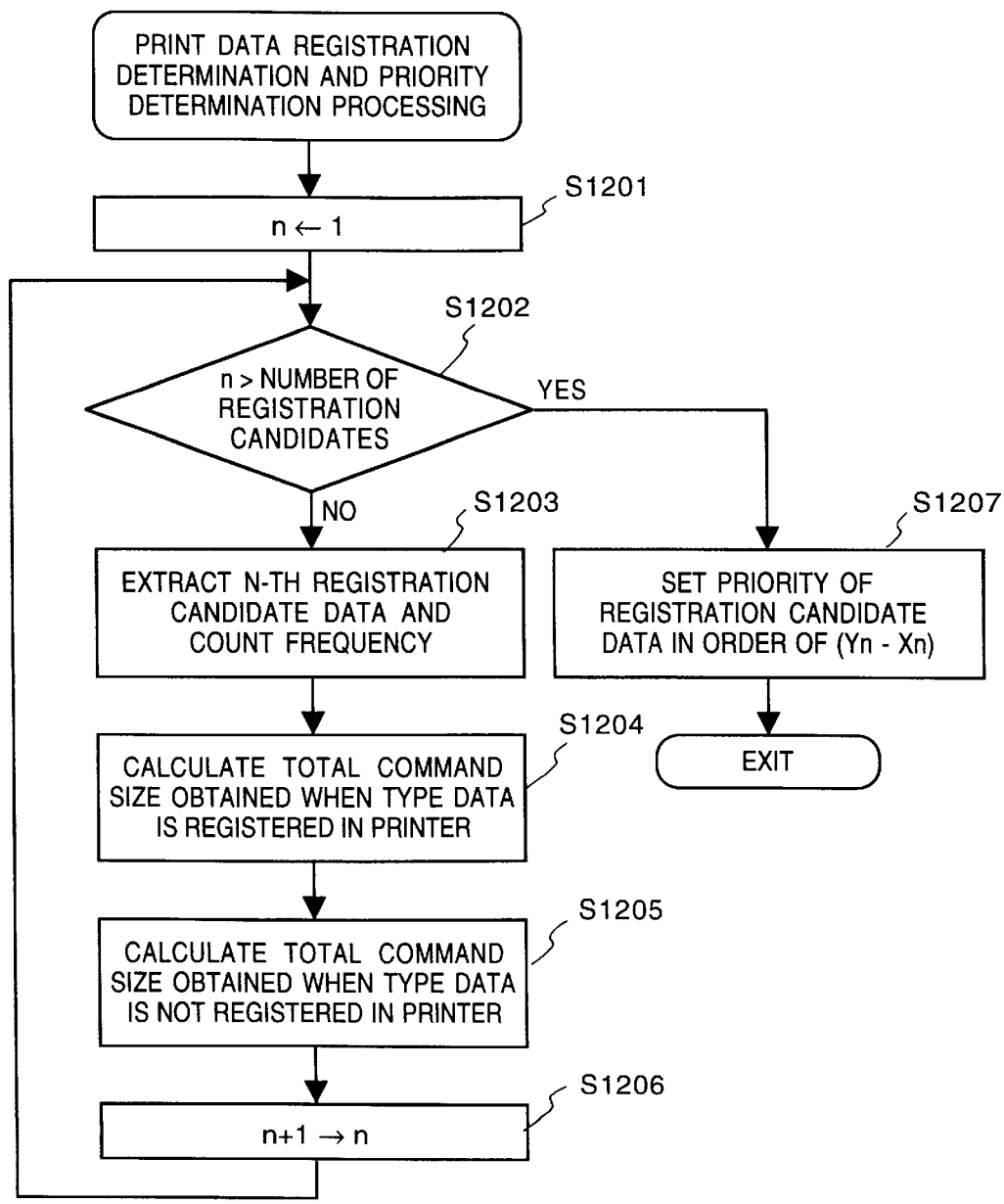
FIG. 14 is a flow chart for determining a priority in the fourth embodiment.

FIG. 14 is a flow chart of type data registration determination and priority determination processing. This sequence shows step S1502 in FIG. 15 in more detail. In this processing, the print data check unit 1003 determines whether it is effective to register a repeat pattern as a candidate of type data to be registered and determines the priority of the repeat pattern.

In step S1201, a counter n meaning a data number of the repeat pattern is initialized. In step S1202, it is determined whether calculation of print command size for all repeat patterns is completed for a case that the repeat patterns are replaced with ID codes and for a case that the repeat patterns are not replaced. If YES in step S1202, the flow advances to step S1207. If NO in step S1202, processing in steps S1203 to S1206 is performed. In step S1203, a repeat pattern as registration candidate data is extracted from unprocessed print data, and the frequency of the pattern in the print data is counted. In step S1204, the total size of a command which is transferred from the host computer to the printer as print data when the registration candidate data extracted in step S1203 is registered in the printer is calculated and stored in a variable Xn. In step S1205, the total size of a command which is transferred from the host computer to the printer as print data when the registration candidate data extracted in step S1203 is not registered in the printer is calculated and stored in a variable Yn. In step S1206, the counter n is incremented by one.

In step S1207, since type data registration in the printer is more effective when a value of (total print data size without registration (Yn)—total print data size with registration (Xn)) is larger, a higher priority is set for registration candidate data having the value of (Yn−Xn).

As described above, when print data such as a repeatedly appearing data pattern is registered in the printer in accordance with the print command size of the data pattern which repeatedly appears in the print data such as image data to be printed, the transfer data amount from the host computer to the printer can be decreased, and the time required for transfer can be shortened. In addition, since a repeat pattern which appears frequently can be stored, as type data, in the print data storing area of the printer, high-speed printing processing can be performed.

This processing can also be applied to a bitmap character obtained by developing an outline font. A pattern with a high frequency is selected from developed bitmap character patterns, added with a print data ID, and registered in the printer, as in the above embodiment. With this processing, printing processing is enabled only by sending an instruction about the print data ID and the printing position, so that the transfer data amount can be decreased. Character patterns which cannot be registered on the printer side can be printed by transferring the unprocessed bitmap patterns. The reason why a pattern with a high use frequency is selected and registered is that this processing can effectively decrease the transfer amount.

When a bit image is replaced with a code, i.e., its data ID, as in the fourth embodiment, data sent from the host computer to the printer consists of image data and code data. Such data is conventionally processed, so the data can be similarly processed. For example, image data includes, at its start portion, data representing that the data is image data and data representing the data size and a printing position, which are followed by bit stream data. In code data, code data follows data representing that the data is code data and data representing the printing position. Therefore, when a specific repeat pattern is extracted from image data and replaced with a data ID, procedures for rearranging the print data in accordance with the above format are executed.

The present invention may be applied to a system consisting of a plurality of equipments (e.g., a host computer, an interface equipment, a reader, and a printer) or an apparatus consisting of a single equipment (e.g., a copying machine and a facsimile apparatus).

(Other Embodiments)

Figure 16:
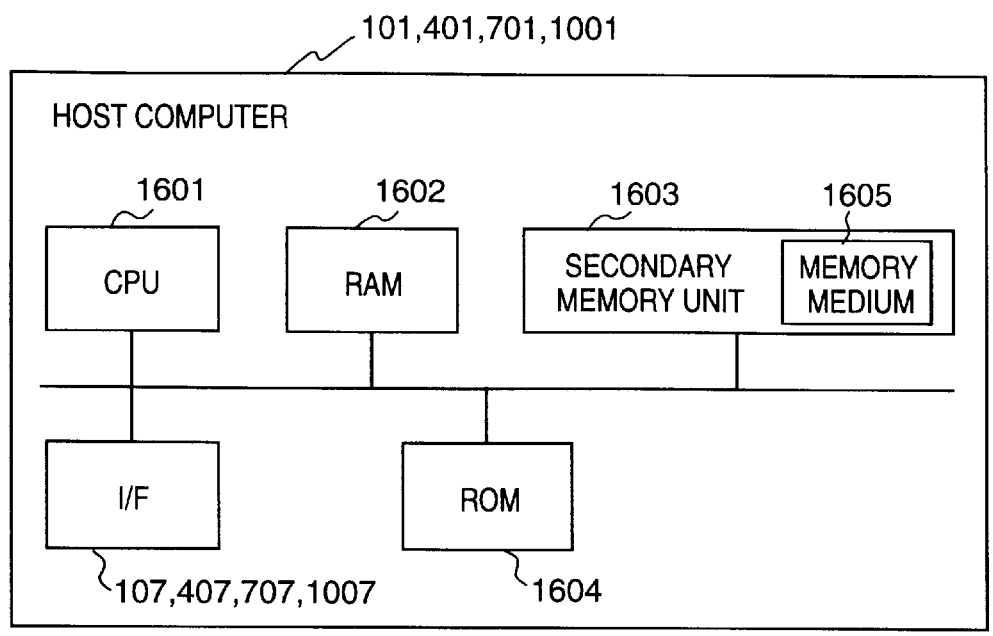
FIG. 16 is a block diagram showing the physical arrangement of a host computer in the first to fourth embodiments.

FIG. 16 is a block diagram schematically showing the physical arrangement of the host computer in each of the first to fourth embodiments. The function of the printer driver 102, 402, 702, or 1002 in each of the above embodiments can be realized by executing a program code corresponding to the sequence of the flow chart of FIG. 2, 5, 8, 11, or 14 and stored in a RAM 1602 or 1604 by a CPU 1602 incorporated in the host computer in each of the above embodiments. The program code can also be temporarily stored in a secondary memory unit 1603 including a memory medium 1605 using magnetism or the like, loaded in the RAM 1602 or 1604, and executed.

As described above, the object of the present invention is also achieved when the memory medium in which the program code of software for realizing the function of each of the above embodiments is recorded is supplied to a system or apparatus, and the computer (or a CPU or MPU) of the system or apparatus reads out and executes the program code stored in the memory medium.

In this case, the program code itself, which is read out from the memory medium, realizes the new function of the present invention. Therefore, the memory medium storing the program code constitutes the present invention.

As the memory medium 1605 for supplying the program code, a floppy disk, a hard disk, an optical disk, a magnetooptical disk, a CD-ROM, a CD-R, a magnetic tape, a non-volatile memory card, a ROM, or the like can be used.

In addition, the function of each of the above embodiments can be realized not only when the computer executes the readout program code but also when an operating system operating on the computer performs part or all of actual processing on the basis of an instruction of the program code.

Furthermore, the function of each of the above embodiments can be realized when the program code read out from the memory medium is written in a memory provided to a feature expansion board inserted in the computer or a feature expansion unit connected to the computer, and thereafter, a CPU or the like of the feature expansion board or unit performs part or all of actual processing.

Figure 17:
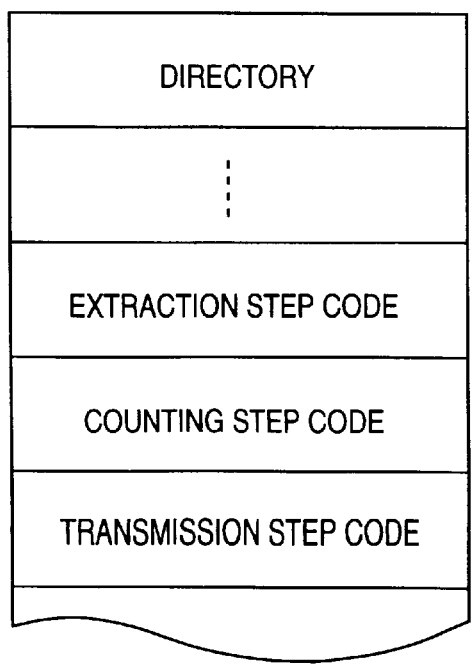
FIG. 17 is a view showing the content of a recording medium which stores a program code for realizing a printer driver in the first to fourth embodiments.

When the present invention is applied to the memory medium, a program code corresponding to the above-described flow chart is stored in the memory medium. That is, each module shown in a memory map of FIG. 17 is stored in the memory medium.

More specifically, at least modules of program codes such as an extraction processing code for extracting type data from print data, a counting processing code for counting the frequency of the extracted type data, and a transmission processing code for transmitting the type data and a corresponding identification code on the basis of the frequency can be stored in the memory medium.

The present invention is not limited to the above embodiments and various changes and modifications can be made within the spirit and scope of the present invention. Therefore, to apprise the public of the scope of the present invention, the following claims are made.

What is claimed is:

1. An information processing apparatus for generating print information to be printed by a printing apparatus, comprising:

memory means for storing desired type data and a corresponding identification code;

transmission means, for transmitting print information to the printing apparatus;

extraction means for extracting type data from the print information before the print information is transmitted by said transmission means;

counting means for counting a print frequency of the type data extracted by said extraction means;

type data transmission means for causing the type data included in the print information to correspond to an identification code on the basis of the print frequency counted by said counting means and transmitting the type data and the corresponding identification code to the printing apparatus; and replacement means for replacing the type data included in the print information to be transmitted by said transmission means and stored in said memory means with the corresponding identification code so as to reduce the size of the print information to be transmitted to the printing apparatus.

2. The apparatus according to claim 1, wherein said type data transmission means transmits the type data and the corresponding identification code within a range not to exceed a predetermined data amount in an order from type data with a high frequency counted by said counting means.

3. The apparatus according to claim 1, wherein said type data transmission means calculates, on the basis of the frequency counted by said counting means, a decrease amount of the print information obtained by replacing the type data with the corresponding identification code, and transmits the type data and the corresponding identification code within a range not to exceed a predetermined data amount in an order from type data with a large decrease amount.

4. The apparatus according to claim 1, further comprising memory means for storing the type data and the corresponding identification code, which are transmitted by said transmission means.

5. The apparatus according to claim 1, further comprising acquisition means for acquiring a usable memory capacity from said printing apparatus, and wherein said type data transmission means transmits the type data and the corresponding identification code within a range not to exceed the usable memory capacity acquired by said acquisition means.

6. The apparatus according to claim 1, wherein the type data is character string data.

7. The apparatus according to claim 1, wherein the type data is image data.

8. The apparatus according to claim 1, wherein said type data transmission means includes means for transmitting an instruction for deleting desired type data and identification code from already transmitted type data and corresponding identification codes when a usable memory capacity in said printing apparatus is insufficient.

9. The apparatus according to claim 4, wherein said type data transmission means has means for receiving, from said printing apparatus, information representing that already transmitted type data and corresponding identification code are deleted, and means for deleting the informed type data and the corresponding identification code from said memory means.

10. The apparatus according to claim 4, further comprising replacement means for replacing the type data included in the print data and stored in said memory means with the identification code, and transmission means for transmitting the print data obtained by said replacement means to said printing apparatus.

11. A printing system having an information processing apparatus for generating print information, and a printing apparatus, connected to said information processing apparatus, for printing an image on the basis of the print information from said information processing apparatus, comprising:

memory means for storing desired type data and a corresponding identification code;

extraction means, in said information processing apparatus, for extracting type data from the print information before the print information is transmitted to the printing apparatus;

counting means for counting a print frequency of the type data extracted by said extraction means;

first memory means, in said printing apparatus, for storing the type data in correspondence with an identification code in accordance with the print frequency counted by said counting means;

type data transmission means for causing the type data included in the print information to correspond to an identification code on the basis of the print frequency counted by said counting means and transmitting the type data and the corresponding identification code from said information processing apparatus to said printing apparatus;

second memory means, in said information processing apparatus, for storing the type data and the corresponding identification code, which are stored in said memory means;

print information transmission means for replacing the type data included in the print information and stored in said second memory means with the corresponding identification code so as to reduce the size of the print information to be transmitted to said printing apparatus and transmitting the print information obtained upon replacement to said printing apparatus; and output means, in said printing apparatus, for receiving the print information, replacing the identification code included in the print information with the corresponding type data, and printing an image on the basis of the print information obtained upon replacement.

12. The system according to claim 11, wherein said counting means counts the frequency of the same type data in the print information, and said memory means preferentially stores type data with a high frequency.

13. The system according to claim 11, wherein said counting means counts a data amount which decreases when the type data in the print data is replaced with the identification code in units of type data, and said memory means stores type data with a large data decrease amount with a priority in an order of the data decrease amount.

14. The system according to claim 11, wherein the type data is character string data.

15. The system according to claim 11, wherein the type data is image data.

16. An information processing method in a print control for an information processing apparatus connected to a printing apparatus, comprising:

an extraction step of extracting type data from the print information before the print information is transmitted to the printing apparatus;

a counting step of counting a print frequency of the type data extracted in the extraction step;

a type data transmission step of causing the type data included in the print information to correspond to an identification code on the basis of the print frequency counted in the counting step and transmitting the type data and the corresponding identification code to the printing apparatus;

a replacement step of replacing the type data included in the print information to be transmitted in the transmission step with the identification code so as to reduce the size of the print information to be transmitted to the printing apparatus; and a transmission step of transmitting print information in which the type data is replaced with the identification code to the printing apparatus.

17. The method according to claim 16, wherein the type data transmission step includes the step of transmitting the type data and the corresponding identification code within a range not to exceed a predetermined data amount in an order from type data with a high frequency counted in the counting step.

18. The method according to claim 16, wherein the type data transmission step includes the step of calculating, on the basis of the frequency counted in the counting step, a decrease amount of the print information obtained by replacing the type data with the corresponding identification code, and transmitting the type data and the corresponding identification code within a range not to exceed a predetermined data amount in an order from type data with a large decrease amount.

19. The method according to claim 16, further comprising the memory step of storing the type data and the corresponding identification code, which are transmitted in the transmission step, in memory means.

20. The method according to claim 16, further comprising the acquisition step of acquiring a usable memory capacity from said printing apparatus, and wherein the type data transmission step includes the step of transmitting the type data and the corresponding identification code within a range not to exceed the usable memory capacity acquired in the acquisition step.

21. The method according to claim 16, wherein the type data is character string data.

22. The method according to claim 16, wherein the type data is image data.

23. The method according to claim 16, wherein the type data transmission step includes the step of transmitting an instruction for deleting desired type data and identification code from already transmitted type data and corresponding identification codes when a usable memory capacity in said printing apparatus is insufficient.

24. The method according to claim 19, wherein the type data transmission means includes the step of receiving, from said printing apparatus, information representing that already transmitted type data and corresponding identification code are deleted, and the step of deleting the informed type data and the corresponding identification code from said memory means.

25. The method according to claim 19, further comprising the replacement step of replacing the type data included in the print information and stored in the memory step with the identification code, and the transmission step of transmitting the print information obtained in the replacement step to said printing apparatus.

26. A memory medium which stores a program code for controlling printing processing, comprising:

an extraction step code for extracting type date from print information before the print information is transmitted to a printing apparatus;

a counting step code for counting a print frequency of the extracted type data;

a type data transmission step code for causing the type data included in the print information to correspond to an identification code on the basis of the print frequency and transmitting the type data and the corresponding identification code to said printing apparatus;

a replacement step code for replacing the type data included in the print information to be transmitted in the transmission step and stored with the identification code so as to reduce the size of the print information to be transmitted to the printing apparatus; and a transmission step code for transmitting print information in which the type data is replaced with the identification code to the printing apparatus.

27. The apparatus according to claim 1 further comprising:
- checking means for checking a space size of a type data storing means which stores the type data transmitted by said type data transmission means; and
- selecting means for selecting the type data having the highest priority order in accordance with the space size of the type data storing means,
- wherein said replacement means replaces the selected type data with the identification code.

28. The apparatus according to claim 27, wherein type data having the highest priority is type data having the highest frequency.

29. The apparatus according to claim 1 further comprising parsing means for parsing a sentence into a character string included in the print information based on a grammar dictionary, and storing the character string in said memory means as type data.

30. The printing system according to claim 11 further comprising:
- checking means for checking a space size of a type data storing means which stores the type data transmitted by said type data transmission means; and
- selecting means for selecting the type data having the highest priority order in accordance with the space size of the type data storing means,
- wherein said replacement means replaces the selected type data with the identification code.

31. The printing system according to claim 30, wherein type data having the highest priority is type data having the highest frequency.

32. The printing system according to claim 11 further comprising parsing means for parsing a sentence into a character string included in the print information based on a grammar dictionary, and storing the character string in said memory means as type data.

33. The method according to claim 16 further comprising:
- a checking step of checking a space size of a type data storing means which stores the type data transmitted by said type data transmission step; and
- a selecting step of selecting the type data having the highest priority order in accordance with the space size of the type data storing means,
- wherein said replacement step replaces the selected type data with the identification code.

34. The method according to claim 33, wherein type data having the highest priority is type data having the highest frequency.

35. The method according to claim 16 further comprising a parsing step of parsing a sentence into a character string included in the print information based on a grammar dictionary, and storing the character string in a memory means as type data.

36. The memory medium according to claim 26 further comprising:
- a checking step code for checking a space size of a type data storing means which stores the type data transmitted by said type data transmission step code; and
- a selecting step code for selecting the type data having the highest priority order in accordance with the space size of the type data storing means,
- wherein said replacement step code replaces the selected type data with the identification code.

37. The memory medium according to claim 36, wherein type data having the highest priority is type data having the highest frequency.

38. The memory medium according to claim 26 further comprising a parsing step code for parsing a sentence into a character string included in the print information based on a grammar dictionary, and storing the character string in a memory means as type data.

* * * * *

UNITED STATES PATENT AND TRADEMARK OFFICE
CERTIFICATE OF CORRECTION

PATENT NO. : 6,007,261
DATED : December 28, 1999
INVENTOR(S) : Takayuki Fujita et al.

It is certified that error appears in the above-identified patent and that said Letters Patent is hereby corrected as shown below:

Drawings:
Sheet 6 of 16, FIG. 6, "PROCESSING" should read --PROCESSING--

Column 6:
Line 5, "the" should be deleted;
Line 47, "received" should read --receive--.

Column 8:
Line 67, "in stead" should read --instead--.

Column 9:
Line 40, "sufficient" should read --sufficient for--.

Column 11:
Line 23, "and" should read --command--.

UNITED STATES PATENT AND TRADEMARK OFFICE
CERTIFICATE OF CORRECTION

PATENT NO. : 6,007,261
DATED : December 28, 1999
INVENTOR(S) : Takayuki Fujita et al.

It is certified that error appears in the above-identified patent and that said Letters Patent is hereby corrected as shown below:

Column 12:
Line 21, "It" should read --If--;
Line 42, "s805" should read S805--;
Line 45, "s807" should read S807--.

Column 13:
Line 1 "the" should be deleted;
Line 46, "read" should read --reads--;
Line 47, "check" should read --checks--;
Line 55, "Y," should read --Y--.

Column 15:
Line 33, "acquires" should read --acquire--.

Signed and Sealed this

Third Day of July, 2001

*Attest:*

Nicholas P. Godici

NICHOLAS P. GODICI
*Attesting Officer*  *Acting Director of the United States Patent and Trademark Office*